(12) United States Patent
Byun

(10) Patent No.: US 11,681,633 B2
(45) Date of Patent: Jun. 20, 2023

(54) APPARATUS AND METHOD FOR MANAGING META DATA IN MEMORY SYSTEM

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/837,727

(22) Filed: Apr. 1, 2020

(65) Prior Publication Data
US 2021/0026777 A1    Jan. 28, 2021

(30) Foreign Application Priority Data

Jul. 22, 2019   (KR) ........................ 10-2019-0088385

(51) Int. Cl.
  *G06F 12/10*     (2016.01)
  *G06F 12/0804*   (2016.01)
(52) U.S. Cl.
  CPC .......... *G06F 12/10* (2013.01); *G06F 12/0804* (2013.01); *G06F 2212/1032* (2013.01); *G06F 2212/657* (2013.01)
(58) Field of Classification Search
  CPC .. G06F 12/0804; G06F 12/10; G06F 12/0246; G06F 2212/7201
  USPC .................. 711/E12.084, 154, E12.001, 203
  See application file for complete search history.

(56) References Cited

U.S. PATENT DOCUMENTS

| | | | |
|---|---|---|---|
| 5,740,465 A | 4/1998 | Matsunami et al. | |
| 6,553,511 B1 | 4/2003 | DeKoning et al. | |
| 6,996,676 B2 | 2/2006 | Megiddo et al. | |
| 7,549,034 B2 | 6/2009 | Foster, Sr. et al. | |
| 7,613,877 B2 | 11/2009 | Shimozono et al. | |
| 7,856,530 B1 | 12/2010 | Mu | |
| 8,972,957 B2 | 3/2015 | Bates et al. | |
| 9,003,126 B2 | 4/2015 | Cai et al. | |

(Continued)

FOREIGN PATENT DOCUMENTS

| | | |
|---|---|---|
| KR | 10-2017-0006427 A | 1/2017 |
| KR | 10-2017-0081126 A | 7/2017 |

OTHER PUBLICATIONS

Differences between disk cache write-through and write-back, Huawei Enterprise Support Community, Jun. 6, 2016 <https://forum.huawei.com/enterprise/en/differences-between-disk-cache-write-through-and-write-back/thread/203781-891>.

(Continued)

*Primary Examiner* — Gautam Sain
*Assistant Examiner* — Edward Waddy, Jr.
(74) *Attorney, Agent, or Firm* — IP & T Group LLP

(57) ABSTRACT

A memory system may include a memory device suitable for storing data and a controller suitable for generating and managing map data comprising a logical address of an external device and a physical address of the memory device corresponding to the logical address. The controller uploads at least some of the map data to the external device and uploading a latest version of the uploaded map data to the external device again based on dirty information or access information. The dirty information indicates whether a physical address corresponding to a logical address included in the uploaded map data has been changed. The access information indicates whether an access request for the logical address included in the uploaded map data from the external device has been made.

20 Claims, 30 Drawing Sheets

(56) References Cited

U.S. PATENT DOCUMENTS

| | | |
|---|---|---|
| 9,104,599 B2 | 8/2015 | Atkisson et al. |
| 9,329,846 B1 | 5/2016 | August et al. |
| 9,378,135 B2 | 6/2016 | Bennett |
| 9,400,749 B1 | 7/2016 | Kuzmin et al. |
| 9,703,664 B1 | 7/2017 | Alshawabkeh et al. |
| 10,268,584 B2 | 4/2019 | Hahn |
| 10,783,071 B2* | 9/2020 | Wang ................ G06F 3/0659 |
| 2003/0041212 A1 | 2/2003 | C. Creta et al. |
| 2005/0102297 A1* | 5/2005 | Lloyd ................ H04L 61/1552 |
| 2006/0212674 A1 | 9/2006 | Chung et al. |
| 2007/0118695 A1 | 5/2007 | Lowe et al. |
| 2007/0220201 A1 | 9/2007 | Gill et al. |
| 2009/0125548 A1 | 5/2009 | Moir et al. |
| 2010/0088467 A1 | 4/2010 | Lee et al. |
| 2011/0093648 A1 | 4/2011 | Belluomini et al. |
| 2012/0072698 A1 | 3/2012 | Unesaki et al. |
| 2012/0089811 A1 | 4/2012 | Sawai |
| 2012/0096225 A1 | 4/2012 | Khawand et al. |
| 2012/0124294 A1 | 5/2012 | Atkisson et al. |
| 2013/0124794 A1 | 5/2013 | Bux et al. |
| 2013/0151777 A1 | 6/2013 | Daly et al. |
| 2013/0151778 A1 | 6/2013 | Daly et al. |
| 2013/0151780 A1 | 6/2013 | Daly et al. |
| 2014/0047170 A1 | 2/2014 | Cohen et al. |
| 2014/0173234 A1 | 6/2014 | Jung et al. |
| 2014/0258638 A1 | 9/2014 | Traut et al. |
| 2015/0301744 A1 | 10/2015 | Kim et al. |
| 2015/0347028 A1* | 12/2015 | Kotte ................ G06F 12/08 711/154 |
| 2015/0356020 A1 | 12/2015 | Desai et al. |
| 2015/0378925 A1 | 12/2015 | Misra |
| 2016/0147654 A1 | 5/2016 | Zhao et al. |
| 2016/0267018 A1 | 9/2016 | Shimizu et al. |
| 2016/0274797 A1 | 9/2016 | Hahn |
| 2016/0299715 A1 | 10/2016 | Hashimoto et al. |
| 2016/0371024 A1* | 12/2016 | Park ................ G06F 3/0679 |
| 2016/0378359 A1* | 12/2016 | Jang ................ G06F 12/0246 711/118 |
| 2017/0060202 A1 | 3/2017 | Sundaram et al. |
| 2017/0109089 A1 | 4/2017 | Huang |
| 2017/0192902 A1* | 7/2017 | Hwang ................ G06F 12/0246 |
| 2017/0351452 A1 | 12/2017 | Boyd et al. |
| 2018/0067678 A1 | 3/2018 | Jeong et al. |
| 2018/0088812 A1* | 3/2018 | Lee ................ G06F 12/0246 |
| 2018/0101477 A1 | 4/2018 | Kan et al. |
| 2018/0121121 A1 | 5/2018 | Mehra et al. |
| 2019/0004591 A1 | 1/2019 | Park et al. |
| 2019/0004944 A1 | 1/2019 | Widder et al. |
| 2019/0042464 A1 | 2/2019 | Genshaft et al. |
| 2019/0108131 A1 | 4/2019 | Lee et al. |
| 2019/0171575 A1* | 6/2019 | Chen ................ G06F 12/0246 |
| 2019/0265976 A1 | 8/2019 | Goryavskiy et al. |
| 2019/0266079 A1 | 8/2019 | R et al. |
| 2019/0272104 A1 | 9/2019 | Durnov et al. |
| 2019/0294546 A1 | 9/2019 | Agarwal et al. |
| 2020/0151108 A1* | 5/2020 | Yen ................ G06F 12/1009 |
| 2020/0278797 A1 | 9/2020 | Bavishi |
| 2020/0327063 A1 | 10/2020 | Kang et al. |
| 2020/0334138 A1 | 10/2020 | Byun |
| 2020/0334166 A1 | 10/2020 | Byun et al. |

OTHER PUBLICATIONS

Office Action issued by the USPTO for U.S. Appl. No. 16/709,702 dated Apr. 6, 2021.

Notice of Allowance issued by the USPTO for U.S. Appl. No. 16/717,144 dated Jun. 10, 2021.

Office Action issued by the USPTO for U.S. Appl. No. 16/837,764 dated Aug. 18, 2021.

Office Action issued by the USPTO for U.S. Appl. No. 16/842,416 dated May 3, 2021.

Cai Y, et al., Error characterization, mitigation, recovery in flash-memory-based solid-state drives, Sep. 2017, pp. 1666-1704, vol. 105, Proceedings of the IEEE.

Office Action issued by the USPTO for U.S. Appl. No. 16/709,702 dated Oct. 14, 2021.

Notice of Allowance issued by the USPTO dated Mar. 4, 2022.

Office Action for U.S. Appl. No. 16/842,416 issued by the USPTO dated May 13, 2022.

Office Action for the U.S. Appl. No. 16/842,416 issued by the USPTO dated Feb. 3, 2023.

Office Action for the U.S. Appl. No. 16/842,416 issued by the USPTO dated Oct. 6, 2022.

* cited by examiner

FIG. 1B

| | MAP_C | | STATE_INF |
|---|---|---|---|
| MS#0 | MS#0_SUB#0 | LA0~LA4 | 0 |
| | MS#0_SUB#1 | LA5~LA19 | 0 |
| | MS#0_SUB#2 | LA10~LA14 | 0 |
| | MS#0_SUB#3 | LA15~LA19 | 0 |
| MS#1 | MS#1_SUB#0 | LA20~LA24 | 0 |
| | MS#1_SUB#1 | LA25~LA29 | 0 |
| | MS#1_SUB#2 | LA30~LA34 | 0 |
| | MS#1_SUB#3 | LA35~LA39 | 0 |
| MS#2 | MS#2_SUB#0 | LA40~LA44 | 0 |
| | MS#2_SUB#1 | LA45~LA49 | 0 |
| | MS#2_SUB#2 | LA50~LA54 | 0 |
| | MS#2_SUB#3 | LA55~LA59 | 0 |
| MS#3 | MS#3_SUB#0 | LA60~LA64 | 0 |
| | MS#3_SUB#1 | LA65~LA69 | 0 |
| | MS#3_SUB#2 | LA70~LA74 | 0 |
| | MS#3_SUB#3 | LA75~LA79 | 0 |

FIG. 9B

| L2P_MAP_C | | | before D_INF | after D_INF |
|---|---|---|---|---|
| L2P_MS#0 | L2P_MS#0_SUB#0 | LA0~LA4 | 0 | 0 |
| | L2P_MS#0_SUB#1 | LA5~LA19 | 0 | 0 |
| | L2P_MS#0_SUB#2 | LA10~LA14 | 0 | 0 |
| | L2P_MS#0_SUB#3 | LA15~LA19 | 1 | 1 |
| L2P_MS#1 | L2P_MS#1_SUB#0 | LA20~LA24 | 1 | 1 |
| | L2P_MS#1_SUB#1 | LA25~LA29 | 0 | 1 |
| | L2P_MS#1_SUB#2 | LA30~LA34 | 1 | 1 |
| | L2P_MS#1_SUB#3 | LA35~LA39 | 1 | 1 |
| L2P_MS#2 | L2P_MS#2_SUB#0 | LA40~LA44 | 1 | 1 |
| | L2P_MS#2_SUB#1 | LA45~LA49 | 1 | 1 |
| | L2P_MS#2_SUB#2 | LA50~LA54 | 1 | 1 |
| | L2P_MS#2_SUB#3 | LA55~LA59 | 1 | 1 |
| L2P_MS#3 | L2P_MS#3_SUB#0 | LA60~LA64 | 1 | 1 |
| | L2P_MS#3_SUB#1 | LA65~LA69 | 0 | 0 |
| | L2P_MS#3_SUB#2 | LA70~LA74 | 0 | 0 |
| | L2P_MS#3_SUB#3 | LA75~LA79 | 1 | 1 |

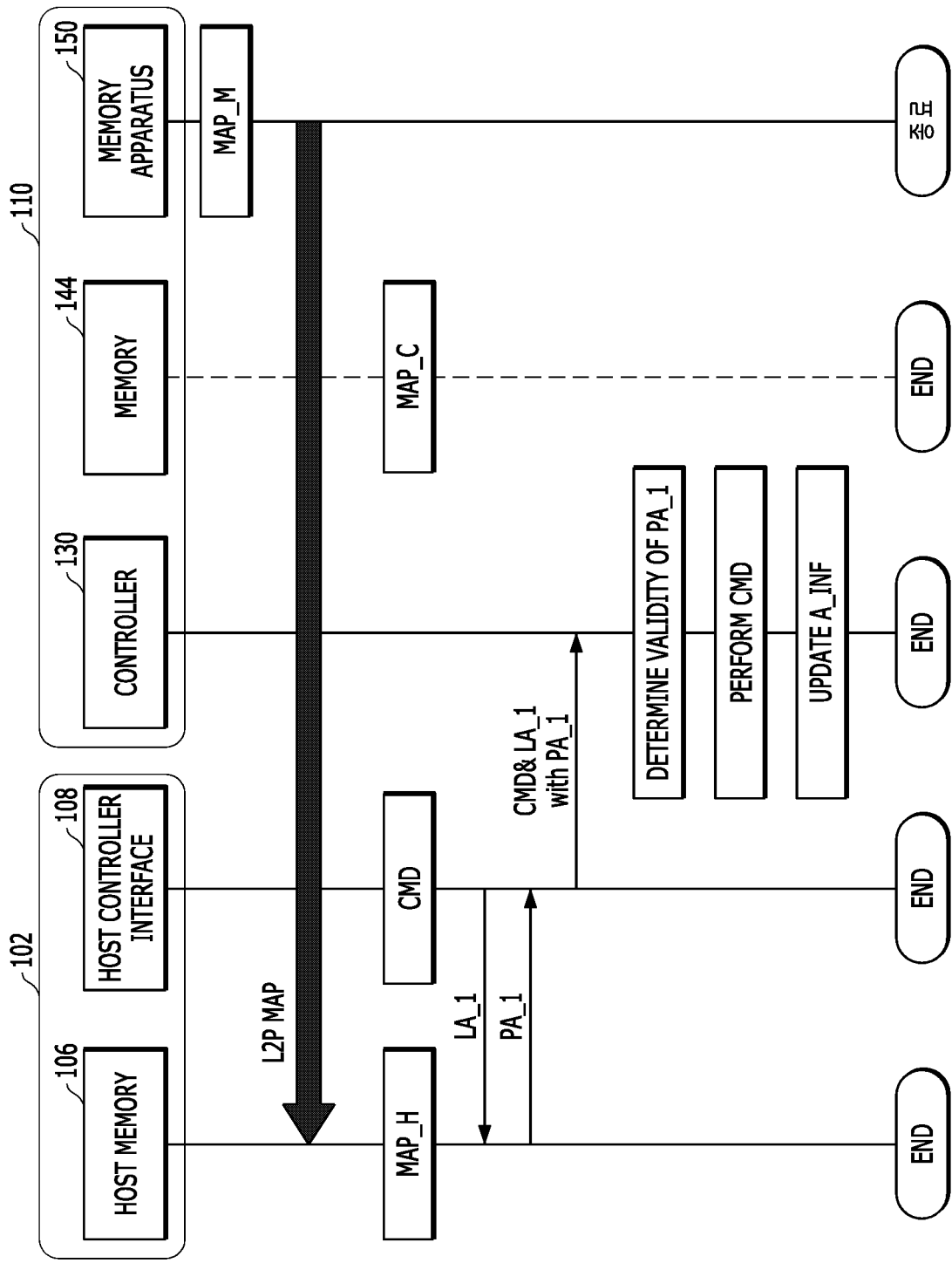

FIG. 11

| Bit<br>Byte | 7 | 6 | 5 | 4 | 3 | 2 | 1 | 0 |
|---|---|---|---|---|---|---|---|---|
| 0 | colspan="8" OPERATION CADE (88h) |||||||||
| 1 | RDPROTECT = 000b ||| DPO | FUA | Reserved | FUA_NV | Reserved |
| 2 | colspan="8" (MSB) LOGICAL ADDRESS / PHYSICAL ADDRESS (LSB) |||||||||
| ... ||||||||||
| 9 ||||||||||
| 10 | colspan="8" (MSB) TRANSFER LENGTH (LSB) |||||||||
| ... ||||||||||
| 13 ||||||||||
| 14 | Ignore | Reserved ||| GROUP NUMBER ||||
| 15 | colspan="8" CONTROL = 00h |||||||||

FIG. 13B

|  | L2P_MAP_C |  | before<br>A_INF | after<br>A_INF |
|---|---|---|---|---|
| L2P_MS#0 | L2P_MS#0_SUB#0 | LA0~LA4 | 0 | 0 |
|  | L2P_MS#0_SUB#1 | LA5~LA19 | 0 | 0 |
|  | L2P_MS#0_SUB#2 | LA10~LA14 | 0 | 0 |
|  | L2P_MS#0_SUB#3 | LA15~LA19 | 1 | 1 |
| L2P_MS#1 | L2P_MS#1_SUB#0 | LA20~LA24 | 1 | 1 |
|  | L2P_MS#1_SUB#1 | LA25~LA29 | 0 | 1 |
|  | L2P_MS#1_SUB#2 | LA30~LA34 | 1 | 1 |
|  | L2P_MS#1_SUB#3 | LA35~LA39 | 1 | 1 |
| L2P_MS#2 | L2P_MS#2_SUB#0 | LA40~LA44 | 1 | 1 |
|  | L2P_MS#2_SUB#1 | LA45~LA49 | 1 | 1 |
|  | L2P_MS#2_SUB#2 | LA50~LA54 | 1 | 1 |
|  | L2P_MS#2_SUB#3 | LA55~LA59 | 1 | 1 |
| L2P_MS#3 | L2P_MS#3_SUB#0 | LA60~LA64 | 1 | 1 |
|  | L2P_MS#3_SUB#1 | LA65~LA69 | 0 | 0 |
|  | L2P_MS#3_SUB#2 | LA70~LA74 | 0 | 0 |
|  | L2P_MS#3_SUB#3 | LA75~LA79 | 1 | 1 |

FIG. 14B

|  | L2P_MAP_C |  | before<br>A_INF | after<br>A_INF |
|---|---|---|---|---|
| L2P_MS#0 | L2P_MS#0_SUB#0 | LA0~LA4 | 0 | 0 |
|  | L2P_MS#0_SUB#1 | LA5~LA19 | 0 | 0 |
|  | L2P_MS#0_SUB#2 | LA10~LA14 | 0 | 0 |
|  | L2P_MS#0_SUB#3 | LA15~LA19 | 20 | 20 |
| L2P_MS#1 | L2P_MS#1_SUB#0 | LA20~LA24 | 6 | 7 |
|  | L2P_MS#1_SUB#1 | LA25~LA29 | 3 | 3 |
|  | L2P_MS#1_SUB#2 | LA30~LA34 | 4 | 4 |
|  | L2P_MS#1_SUB#3 | LA35~LA39 | 0 | 0 |
| L2P_MS#2 | L2P_MS#2_SUB#0 | LA40~LA44 | 6 | 6 |
|  | L2P_MS#2_SUB#1 | LA45~LA49 | 3 | 3 |
|  | L2P_MS#2_SUB#2 | LA50~LA54 | 5 | 5 |
|  | L2P_MS#2_SUB#3 | LA55~LA59 | 2 | 2 |
| L2P_MS#3 | L2P_MS#3_SUB#0 | LA60~LA64 | 0 | 1 |
|  | L2P_MS#3_SUB#1 | LA65~LA69 | 0 | 0 |
|  | L2P_MS#3_SUB#2 | LA70~LA74 | 0 | 0 |
|  | L2P_MS#3_SUB#3 | LA75~LA79 | 1 | 1 |

FIG. 16

| | L2P_MAP_C | | D_INF | SUM | P_INF_D |
|---|---|---|---|---|---|
| L2P_MS#0 | L2P_MS#0_SUB#0 | LA0~LA4 | 0 | 1 | 4 |
| | L2P_MS#0_SUB#1 | LA5~LA19 | 0 | | |
| | L2P_MS#0_SUB#2 | LA10~LA14 | 0 | | |
| | L2P_MS#0_SUB#3 | LA15~LA19 | 1 | | |
| L2P_MS#1 | L2P_MS#1_SUB#0 | LA20~LA24 | 1 | 3 | 2 |
| | L2P_MS#1_SUB#1 | LA25~LA29 | 1 | | |
| | L2P_MS#1_SUB#2 | LA30~LA34 | 0 | | |
| | L2P_MS#1_SUB#3 | LA35~LA39 | 1 | | |
| L2P_MS#2 | L2P_MS#2_SUB#0 | LA40~LA44 | 1 | 4 | 1 |
| | L2P_MS#2_SUB#1 | LA45~LA49 | 1 | | |
| | L2P_MS#2_SUB#2 | LA50~LA54 | 1 | | |
| | L2P_MS#2_SUB#3 | LA55~LA59 | 1 | | |
| L2P_MS#3 | L2P_MS#3_SUB#0 | LA60~LA64 | 1 | 2 | 3 |
| | L2P_MS#3_SUB#1 | LA65~LA69 | 0 | | |
| | L2P_MS#3_SUB#2 | LA70~LA74 | 0 | | |
| | L2P_MS#3_SUB#3 | LA75~LA79 | 1 | | |

FIG. 17

| | L2P_MAP_C | | A_INF | SUM | P_INF_A |
|---|---|---|---|---|---|
| L2P_MS#0 | L2P_MS#0_SUB#0 | LA0~LA4 | 0 | 1 | 4 |
| | L2P_MS#0_SUB#1 | LA5~LA19 | 0 | | |
| | L2P_MS#0_SUB#2 | LA10~LA14 | 0 | | |
| | L2P_MS#0_SUB#3 | LA15~LA19 | 1 | | |
| L2P_MS#1 | L2P_MS#1_SUB#0 | LA20~LA24 | 1 | 3 | 2 |
| | L2P_MS#1_SUB#1 | LA25~LA29 | 1 | | |
| | L2P_MS#1_SUB#2 | LA30~LA34 | 0 | | |
| | L2P_MS#1_SUB#3 | LA35~LA39 | 1 | | |
| L2P_MS#2 | L2P_MS#2_SUB#0 | LA40~LA44 | 1 | 4 | 1 |
| | L2P_MS#2_SUB#1 | LA45~LA49 | 1 | | |
| | L2P_MS#2_SUB#2 | LA50~LA54 | 1 | | |
| | L2P_MS#2_SUB#3 | LA55~LA59 | 1 | | |
| L2P_MS#3 | L2P_MS#3_SUB#0 | LA60~LA64 | 1 | 2 | 3 |
| | L2P_MS#3_SUB#1 | LA65~LA69 | 0 | | |
| | L2P_MS#3_SUB#2 | LA70~LA74 | 0 | | |
| | L2P_MS#3_SUB#3 | LA75~LA79 | 1 | | |

FIG. 18

| | L2P_MAP_C | | A_INF | RANKING | P_INF_A |
|---|---|---|---|---|---|
| L2P_MS#0 | L2P_MS#0_SUB#0 | LA0~LA4 | 0 | 11 | 1 |
| | L2P_MS#0_SUB#1 | LA5~LA19 | 0 | 11 | |
| | L2P_MS#0_SUB#2 | LA10~LA14 | 0 | 11 | |
| | L2P_MS#0_SUB#3 | LA15~LA19 | 20 | 1 | |
| L2P_MS#1 | L2P_MS#1_SUB#0 | LA20~LA24 | 7 | 2 | 2 |
| | L2P_MS#1_SUB#1 | LA25~LA29 | 3 | 6 | |
| | L2P_MS#1_SUB#2 | LA30~LA34 | 4 | 5 | |
| | L2P_MS#1_SUB#3 | LA35~LA39 | 0 | 11 | |
| L2P_MS#2 | L2P_MS#2_SUB#0 | LA40~LA44 | 6 | 3 | 3 |
| | L2P_MS#2_SUB#1 | LA45~LA49 | 3 | 6 | |
| | L2P_MS#2_SUB#2 | LA50~LA54 | 5 | 4 | |
| | L2P_MS#2_SUB#3 | LA55~LA59 | 2 | 8 | |
| L2P_MS#3 | L2P_MS#3_SUB#0 | LA60~LA64 | 1 | 9 | 4 |
| | L2P_MS#3_SUB#1 | LA65~LA69 | 0 | 11 | |
| | L2P_MS#3_SUB#2 | LA70~LA74 | 0 | 11 | |
| | L2P_MS#3_SUB#3 | LA75~LA79 | 1 | 9 | |

FIG. 19B

| L2P_MAP_C | | D_INF | A_INF | AND | SUM | P_INF_N |
|---|---|---|---|---|---|---|
| L2P_MS#0 | L2P_MS#0_SUB#0 | LA0~LA4 | 0 | 0 | 0 | 0 | 4 |
| | L2P_MS#0_SUB#1 | LA5~LA19 | 0 | 0 | 0 | | |
| | L2P_MS#0_SUB#2 | LA10~LA14 | 1 | 0 | 0 | | |
| | L2P_MS#0_SUB#3 | LA15~LA19 | 0 | 1 | 0 | | |
| L2P_MS#1 | L2P_MS#1_SUB#0 | LA20~LA24 | 0 | 1 | 0 | 1 | 3 |
| | L2P_MS#1_SUB#1 | LA25~LA29 | 0 | 1 | 0 | | |
| | L2P_MS#1_SUB#2 | LA30~LA34 | 1 | 1 | 1 | | |
| | L2P_MS#1_SUB#3 | LA35~LA39 | 1 | 0 | 0 | | |
| L2P_MS#2 | L2P_MS#2_SUB#0 | LA40~LA44 | 1 | 1 | 1 | 4 | 1 |
| | L2P_MS#2_SUB#1 | LA45~LA49 | 1 | 1 | 1 | | |
| | L2P_MS#2_SUB#2 | LA50~LA54 | 1 | 1 | 1 | | |
| | L2P_MS#2_SUB#3 | LA55~LA59 | 1 | 1 | 1 | | |
| L2P_MS#3 | L2P_MS#3_SUB#0 | LA60~LA64 | 1 | 1 | 1 | 2 | 2 |
| | L2P_MS#3_SUB#1 | LA65~LA69 | 1 | 1 | 1 | | |
| | L2P_MS#3_SUB#2 | LA70~LA74 | 1 | 0 | 0 | | |
| | L2P_MS#3_SUB#3 | LA75~LA79 | 1 | 0 | 0 | | |

FIG. 20B

| | L2P_MAP_C | | D_INF | A_INF | OR | D_INF_W | SUM | P_INF_D |
|---|---|---|---|---|---|---|---|---|
| L2P_MS#0 | L2P_MS#0_SUB#0 | LA0~LA4 | 0 | 0 | 0 | 0 | 3 | 4 |
| | L2P_MS#0_SUB#1 | LA5~LA19 | 0 | 0 | 0 | 0 | | |
| | L2P_MS#0_SUB#2 | LA10~LA14 | 1 | 0 | 1 | 2 | | |
| | L2P_MS#0_SUB#3 | LA15~LA19 | 0 | 1 | 1 | 1 | | |
| L2P_MS#1 | L2P_MS#1_SUB#0 | LA20~LA24 | 0 | 1 | 1 | 1 | 6 | 3 |
| | L2P_MS#1_SUB#1 | LA25~LA29 | 0 | 1 | 1 | 1 | | |
| | L2P_MS#1_SUB#2 | LA30~LA34 | 1 | 1 | 1 | 2 | | |
| | L2P_MS#1_SUB#3 | LA35~LA39 | 1 | 0 | 1 | 2 | | |
| L2P_MS#2 | L2P_MS#2_SUB#0 | LA40~LA44 | 1 | 1 | 1 | 2 | 8 | 1 |
| | L2P_MS#2_SUB#1 | LA45~LA49 | 1 | 1 | 1 | 2 | | |
| | L2P_MS#2_SUB#2 | LA50~LA54 | 1 | 1 | 1 | 2 | | |
| | L2P_MS#2_SUB#3 | LA55~LA59 | 1 | 1 | 1 | 2 | | |
| L2P_MS#3 | L2P_MS#3_SUB#0 | LA60~LA64 | 1 | 1 | 1 | 2 | 8 | 2 |
| | L2P_MS#3_SUB#1 | LA65~LA69 | 1 | 1 | 1 | 2 | | |
| | L2P_MS#3_SUB#2 | LA70~LA74 | 1 | 0 | 1 | 2 | | |
| | L2P_MS#3_SUB#3 | LA75~LA79 | 1 | 0 | 1 | 2 | | |

FIG. 21B

| L2P_MAP_C | | | D_INF | A_INF | OR | A_INF_W | SUM | P_INF_A |
|---|---|---|---|---|---|---|---|---|
| L2P_MS#0 | L2P_MS#0_SUB#0 | LA0~LA4 | 0 | 0 | 0 | 0 | 3 | 4 |
| | L2P_MS#0_SUB#1 | LA5~LA9 | 0 | 0 | 0 | 0 | | |
| | L2P_MS#0_SUB#2 | LA10~LA14 | 1 | 0 | 1 | 1 | | |
| | L2P_MS#0_SUB#3 | LA15~LA19 | 0 | 1 | 1 | 2 | | |
| L2P_MS#1 | L2P_MS#1_SUB#0 | LA20~LA24 | 0 | 1 | 1 | 2 | 7 | 2 |
| | L2P_MS#1_SUB#1 | LA25~LA29 | 0 | 1 | 1 | 2 | | |
| | L2P_MS#1_SUB#2 | LA30~LA34 | 1 | 1 | 1 | 2 | | |
| | L2P_MS#1_SUB#3 | LA35~LA39 | 1 | 0 | 1 | 1 | | |
| L2P_MS#2 | L2P_MS#2_SUB#0 | LA40~LA44 | 1 | 1 | 1 | 2 | 8 | 1 |
| | L2P_MS#2_SUB#1 | LA45~LA49 | 1 | 1 | 1 | 2 | | |
| | L2P_MS#2_SUB#2 | LA50~LA54 | 1 | 1 | 1 | 2 | | |
| | L2P_MS#2_SUB#3 | LA55~LA59 | 1 | 1 | 1 | 2 | | |
| L2P_MS#3 | L2P_MS#3_SUB#0 | LA60~LA64 | 1 | 1 | 1 | 2 | 6 | 3 |
| | L2P_MS#3_SUB#1 | LA65~LA69 | 1 | 1 | 1 | 2 | | |
| | L2P_MS#3_SUB#2 | LA70~LA74 | 1 | 0 | 1 | 1 | | |
| | L2P_MS#3_SUB#3 | LA75~LA79 | 1 | 0 | 1 | 1 | | |

FIG. 22

| | L2P_MAP_C | | D_INF | A_INF | AND | A_INF_W | SUM | P_INF_A |
|---|---|---|---|---|---|---|---|---|
| L2P_MS#0 | L2P_MS#0_SUB#0 | LA0~LA4 | 0 | 0 | 0 | 0 | 0 | 4 |
| | L2P_MS#0_SUB#1 | LA5~LA19 | 0 | 0 | 0 | 0 | | |
| | L2P_MS#0_SUB#2 | LA10~LA14 | 1 | 0 | 0 | 0 | | |
| | L2P_MS#0_SUB#3 | LA15~LA19 | 0 | 20 | 0 | 0 | | |
| L2P_MS#1 | L2P_MS#1_SUB#0 | LA20~LA24 | 0 | 7 | 0 | 0 | 5 | 3 |
| | L2P_MS#1_SUB#1 | LA25~LA29 | 0 | 3 | 0 | 0 | | |
| | L2P_MS#1_SUB#2 | LA30~LA34 | 1 | 4 | 1 | 5 | | |
| | L2P_MS#1_SUB#3 | LA35~LA39 | 1 | 0 | 0 | 0 | | |
| L2P_MS#2 | L2P_MS#2_SUB#0 | LA40~LA44 | 1 | 6 | 1 | 7 | 20 | 1 |
| | L2P_MS#2_SUB#1 | LA45~LA49 | 1 | 3 | 1 | 4 | | |
| | L2P_MS#2_SUB#2 | LA50~LA54 | 1 | 5 | 1 | 6 | | |
| | L2P_MS#2_SUB#3 | LA55~LA59 | 1 | 2 | 1 | 3 | | |
| L2P_MS#3 | L2P_MS#3_SUB#0 | LA60~LA64 | 1 | 1 | 1 | 2 | 3 | 2 |
| | L2P_MS#3_SUB#1 | LA65~LA69 | 1 | 0 | 0 | 0 | | |
| | L2P_MS#3_SUB#2 | LA70~LA74 | 0 | 0 | 0 | 0 | | |
| | L2P_MS#3_SUB#3 | LA75~LA79 | 1 | 1 | 0 | 1 | | |

FIG. 23

| L2P_MAP_C | | D_INF | A_INF | AND | REPRESENTATIVE VALUE | A_INF_W | SUM | P_INF_A |
|---|---|---|---|---|---|---|---|---|
| L2P_MS#0 | L2P_MS#0_SUB#0 | LA0~LA4 | 0 | 0 | 0 | 0 | 0 | 4 |
| | L2P_MS#0_SUB#1 | LA5~LA19 | 0 | 0 | 0 | | 0 | |
| | L2P_MS#0_SUB#2 | LA10~LA14 | 1 | 0 | 0 | | 0 | |
| | L2P_MS#0_SUB#3 | LA15~LA19 | 0 | 20 | 0 | | 0 | |
| L2P_MS#1 | L2P_MS#1_SUB#0 | LA20~LA24 | 0 | 7 | 0 | 1 | 1 | 3 | 2 |
| | L2P_MS#1_SUB#1 | LA25~LA29 | 0 | 3 | 0 | | 1 | |
| | L2P_MS#1_SUB#2 | LA30~LA34 | 1 | 4 | 1 | | 1 | |
| | L2P_MS#1_SUB#3 | LA35~LA39 | 1 | 0 | 0 | | 0 | |
| L2P_MS#2 | L2P_MS#2_SUB#0 | LA40~LA44 | 1 | 6 | 1 | 1 | 1 | 4 | 1 |
| | L2P_MS#2_SUB#1 | LA45~LA49 | 1 | 3 | 1 | | 1 | |
| | L2P_MS#2_SUB#2 | LA50~LA54 | 1 | 5 | 1 | | 1 | |
| | L2P_MS#2_SUB#3 | LA55~LA59 | 1 | 2 | 1 | | 1 | |
| L2P_MS#3 | L2P_MS#3_SUB#0 | LA60~LA64 | 1 | 1 | 1 | 1 | 1 | 2 | 3 |
| | L2P_MS#3_SUB#1 | LA65~LA69 | 1 | 0 | 0 | | 0 | |
| | L2P_MS#3_SUB#2 | LA70~LA74 | 0 | 0 | 0 | | 0 | |
| | L2P_MS#3_SUB#3 | LA75~LA79 | 1 | 1 | 0 | | 1 | |

APPARATUS AND METHOD FOR MANAGING META DATA IN MEMORY SYSTEM

CROSS-REFERENCE TO RELATED APPLICATION

This application claims priority under 35 U.S.C. § 119 to Korean Patent Application No. 10-2019-0088385, filed on Jul. 22, 2019, which is incorporated herein by reference in its entirety.

BACKGROUND

1. Field

Various embodiments relate to a memory system and a data processing apparatus including the memory system, and more particularly, to a method and apparatus for managing the meta data of a memory system.

2. Discussion of the Related Art

Recently, the paradigm for a computing environment has shifted to ubiquitous computing, which enables computer systems to be accessed anytime and everywhere. As a result, the use of portable electronic devices, such as mobile phones, digital cameras, notebook computers and the like, are rapidly increasing. Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device using a non-volatile semiconductor memory device is advantageous in that it has excellent stability and durability because it has no mechanical driving part (e.g., a mechanical arm), and has high data access speed and low power consumption. In the context of a memory system having such advantages, its data storage device may be implemented by a USB (Universal Serial Bus) memory device, a memory card having any of various interfaces, a solid state drive (SSD) or the like.

SUMMARY

Various embodiments are directed to a device, an apparatus and method, which can reduce overhead in data transmission between a memory system within a data processing apparatus and a computing apparatus or a host, occurring due to an operation of transmitting, by the memory system, map data, in the data processing apparatus in which the memory system may transmit map data to the computing apparatus or the host and the computing apparatus or the host may transmit an address, together with a command, to the memory system using the map data.

Also, various embodiments are directed to a memory system, a data processing system and a method of driving them, which can improve efficiency of map data management by subdividing state information of map data into a plurality of map segment sub-area, instead of a map segment unit of map data, and managing the state information for each divided map segment sub-area.

Also, various embodiments are directed to a memory system, a data processing system and a method of driving them, which can reduce overhead of the memory system occurring due to unnecessary L2P conversion and thus improve the execution speed of a command operation of the memory system and efficiency of the command operation, because the memory device performs the command operation on a physical address received from an external device along with a command.

Also, various embodiments are directed to a memory system, a data processing system and a method of driving them, which can increase convenience of map data management by changing a value of state information of map data, stored in the memory system and having a bitmap form, a flag form, a table form or a list form, and writing whether the storage location of data corresponding to a given logical address has been changed and an invalid physical address, when the map data accompanied by a change in the storage location of the data stored in the memory system is updated.

Also, various embodiments are directed to a memory system, a data processing system and a method of driving them, which can improve the speed of an operation of determining the validity of a physical address and thus improve the speed of a command operation because the memory system determines the validity of a physical address received from an external device along with a command based on state information of map data without separate map data search.

According to an embodiment of the present invention, a memory system comprising: a memory device suitable for storing data; and a controller suitable for generating and managing map data comprising a logical address of an external device and a physical address of the memory device corresponding to the logical address, wherein the controller uploads at least some of the map data to the external device, wherein the controller uploads a latest version of the uploaded map data to the external device based on at least one of dirty information or access information, wherein the dirty information indicates whether a physical address corresponding to a logical address in the uploaded map data has been changed, and the access information indicates whether an access request for the logical address in the uploaded map data has been made from the external device.

The controller stores the latest version of the uploaded map data in the memory device by units of map segments. The controller divides each of map segments of the uploaded map data into a plurality of sub-segments, and the controller generates the dirty information and access information for each of the sub-segments. The controller sets uploading priorities of the map segments based on at least one of the dirty information or the access information of the sub-segments, and the controller uploads the map data to the external device, for each map segment, based on the set uploading priorities. The dirty information initially has a first value, and the controller updates the first value of the dirty information of a sub-segment to a second value when the physical address corresponding to the logical address in the sub-segment is changed. The access information initially has a first value, and the controller updates the first value of the access information of a sub-segment to a second value when an access request for the logical address in the sub-segment is made by the external device. The access information initially has a first value, and the controller updates the first value of the access information of a sub-segment to a second value increased by 1 with respect to the first value each time an access request for the logical address in the sub-segment is made by the external device, the second value includes multiple values. The controller sets a higher uploading priority for a map segment that includes a greater number of sub-segments for which the dirty information is represented by the second value. The controller sets a higher uploading priority for a map segment that includes a greater number of sub-segments for which the access information is represented by the second value. The controller sets a higher uploading priority for a map segment having a sub-segment for which the access information is represented by a higher value of the multiple second values. The controller sets a higher uploading priority for a map segment having a greater number of sub-segments for which the dirty information is represented by the second value and for which the access information is represented by the second value. The controller sets a higher uploading priority for a map segment having a greater number of sub-segments for which the dirty information is represented by the second value, among map segments having sub-segments for which the dirty information is represented by the second value or for which the access information is represented by the second value. The controller sets a higher uploading priority for a map segment having a greater number of sub-segments for which the access information is represented by a higher value of the multiple second values, among map segments having sub-segments for which the dirty information is represented by the second value or for which the access information is represented by the second value. The controller sets a higher uploading priority for a map segment having a sub-segment for which the access information is represented by a higher value of the multiple second values, among map segments having sub-segments for which the dirty information is represented by the second value and for which the access information is represented by the second value. The controller sets a higher uploading priority for a map segment having a greater number of sub-segments for which the access information is represented by the second value of one or higher, among map segments having sub-segments for which the dirty information is represented by the second value and for which the access information is represented by the second value. When a command, a first logical address corresponding to the command, and a first physical address corresponding to the first logical address are received from the external device, the controller identifies a first sub-segment including the first logical address from the map data and further determines whether the first physical address is valid using first dirty information of the first sub-segment. The controller determines the first physical address to be valid when the first dirty information is represented by a first value, and the controller determines the first physical address to be invalid when the first dirty information is represented by a second value. The controller performs a command operation according to the command on the valid first physical address, and the controller updates first access information of the first sub-segment. The first access information is represented in a bitmap form or a counter form.

According to an embodiment of the present invention, a memory system comprising: a memory device suitable for storing data; and a controller suitable for generating and updating map data comprising a logical address of an external device and a physical address of the memory device corresponding to the logical address, wherein the controller stores a latest version of the map data in the memory device and the external device by units of map segments, and the controller generates and updates state information on the map data uploaded to the external device by units of sub-segments of the map segment.

The state information comprises: dirty information indicating whether the physical address corresponding to the logical address in the sub-segment has been changed, and access information indicating whether the external device has accessed the logical address in the sub-segment. The controller transmits the map data to the external device based on the dirty information of the sub-segment or the access information of the sub-segment. When a command, a first logical address corresponding to the command, and a first physical address corresponding to the first logical address are received from the external device, the controller determines whether the first physical address is valid using first dirty information of a first sub-segment comprising the first logical address. The controller performs a command operation according to the command on the valid first physical address, and the controller updates first access information of the first sub-segment after performing the command operation.

According to an embodiment of the present invention, an operating method of a controller, the operating method comprising: generating one or more system segments, each including one or more sub-segments, each having one or more pieces of information, each piece representing a mapping relationship between a logical address and a physical address; providing the system segments to a host to store as host segments; accessing, within a memory device, a region related to the physical address, which is included in the piece provided from the host; and updating one or more of the host segments based on history information representing at least one of whether the physical address has changed and whether the region has been accessed. The sub-segment within the system segment includes the history information of the pieces corresponding thereto.

Other technical objects and effects will be understood by those skilled in the art to which this disclosure pertains from the following description.

BRIEF DESCRIPTION OF THE DRAWINGS

FIGS. 1A and 1B illustrate an example of a method of generating, by a memory system according to an embodiment of this disclosure, state information.

FIGS. 9A and 9B illustrate an example of a method of managing dirty information according to an embodiment of this disclosure.

FIGS. 10 and 11 illustrate an example of a method of performing, by a data processing system according to an embodiment of this disclosure, a command operation.

FIGS. 12, 13A, 13B, 14A and 14B illustrate an example of a method of performing, by a memory system according to an embodiment of this disclosure, a command operation.

FIGS. 15 to 18 illustrate an example of a method of performing, by a memory system according to an embodiment of this disclosure, a map uploading operation.

FIGS. 19A to 23 illustrate another example of a method of performing, by a memory system according to an embodiment of this disclosure, a map uploading operation.

DETAILED DESCRIPTION

Figure 1A:
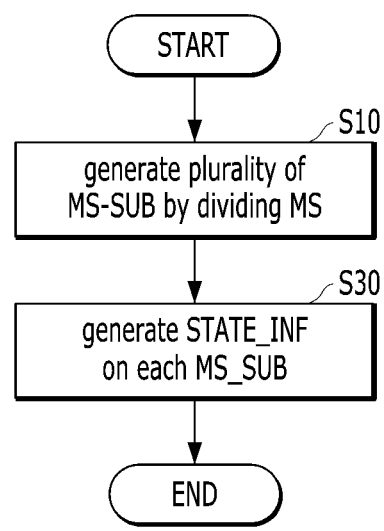

Various embodiments of the invention are described below in detail with reference to the accompanying drawings. The present invention may, however, be embodied in different forms and should not be construed as limited to the embodiments set forth herein. Rather, these embodiments are provided so that this disclosure is thorough and complete, and fully conveys the scope of the invention to those skilled in the art. Throughout the disclosure, like reference numerals refer to like parts throughout the various figures and embodiments of this disclosure.

Hereinafter, various embodiments of this disclosure are described in more detail with reference to the accompanying drawings. It is to be noted that in the following description, description of well-known material may be omitted so as not to unnecessarily obscure aspects and features of the present invention. Also, throughout the specification, reference to "an embodiment," "another embodiment" or the like is not necessarily to only one embodiment, and different references to any such phrase are not necessarily to the same embodiment(s).

FIGS. 1A and 1B are diagrams illustrating a method of generating, by a memory system according to an embodiment of this disclosure, state information of meta data uploaded to a host.

Meta data may include information on command data corresponding to a command received by a memory system from a host, that is, an external device, information on a command operation corresponding to a command, information on memory blocks of a memory device in which a command operation is performed, and information on map data corresponding to a command operation. In other words, meta data may include any and all information and data pertaining to a command received from a host, except program data corresponding to the command.

Furthermore, meta data may include map data stored in a memory system and configured with L2P map segments L2P_MS to which a logical address LA and a physical address PA corresponding to the logical address LA have been mapped.

If a memory system transmits map data to a host, an operation may be performed in a map segment unit having a set size. This is for improving efficiency of data communication between the memory system and the host. Accordingly, the memory system can transmit information on a plurality of physical addresses PA, corresponding to a plurality of logical addresses LA, to the host at the same time. For example, one L2P map segment L2P_MS may include information that connects the plurality of logical addresses LA and the plurality of physical addresses PA.

A process of transmitting, by a memory system, map data to a host is described below with reference to FIG. 7 and other figures. Furthermore, an effect which may be obtained because a memory system shares map data with a host is described below with reference to FIG. 8 and other figures.

Referring to FIG. 1A, a memory system according to an embodiment of this disclosure generates a plurality of L2P sub-segments L2P_MS_SUB by dividing each of a plurality of L2P map segments L2P_MS included in map data (S10).

In this case, the plurality of L2P map segments L2P_MS may have been transmitted from the memory system to a host. Furthermore, the memory system generates state information STATE_INF on each of the plurality of generated sub-segments L2P_MS_SUB (S30).

The state information STATE_INF according to an embodiment of this disclosure may indicate the states of a non-volatile memory element and map data included in the memory system. In particular, the state information STATE_INF according to an embodiment of this disclosure may include dirty information D_INF, invalid address information INV_INF, access information A_INF and priority information P_INF.

The dirty information D_INF and the access information A_INF may represent at least one of whether a physical address has changed and whether a region related to the physical address. Accordingly, the dirty information D_INF and the access information A_INF which may be referred to as history information.

The dirty information D_INF may be of a bitmap form having an initial value of a first level (e.g., 0), which is updated with a value of a second level (e.g., 1) when a physical address corresponding to a given logical address LA is changed.

The invalid address information INV_INF may indicate information on a physical address corresponding to a given logical address LA and may be of a bitmap form having an initial value of a first level, which is updated with a value of a second level (e.g., 1) when the physical address is invalidated.

The access information A_INF may be of a bitmap form having an initial value of a first level, which is updated with a value of a second level (e.g., 1) when an access request for a given logical address LA is received from a host. In another embodiment, the access information A_INF may be of a counter form having an initial value of a first level and increasing whenever an access request for a logical address LA is received from a host. The access request for the logical address LA from the host means that the host requests access (e.g., read request) to data corresponding to the logical address LA.

The priority information P_INF may include uploading priority information of map segments included in map data. Specifically, map data whose physical address is changed and for which access has been requested by a host may have a high uploading priority.

A memory system according to an embodiment of this disclosure may determine the validity of a physical address, received along with a command from a host, using dirty information D_INF or invalid address information INV_INF. Furthermore, a memory system according to an embodiment of this disclosure may generate priority information P_INF using dirty information D_INF and access information A_INF. Furthermore, a memory system according to an embodiment of this disclosure may upload map segments, included in map data, to a host based on priority information P_INF.

Referring to FIG. 1B, map data may include a plurality of L2P map segments L2P_MS #0 to L2P_MS #3. For example, the first L2P map segment L2P_MS #0 includes L2P map data for logical addresses "LA0 to LA19." The second L2P map segment L2P_MS #1 includes L2P map data for logical addresses "LA20 to LA39." The third L2P map segment L2P_MS #2 includes L2P map data for logical addresses "LA40 to LA59." The fourth L2P map segment L2P_MS #3 includes L2P map data for logical addresses "LA60 to LA79." That is, each of the L2P map segments may include L2P map data for 20 logical addresses.

Each of the plurality of L2P map segments L2P_MS #0 to L2P_MS #3 according to an embodiment of this disclosure may include a plurality of L2P sub-segments L2P_MS #n_SUB #0 to L2P_MS #n_SUB #3. Accordingly, state information STATE_INF according to an embodiment of this disclosure may be generated and updated for each of the plurality of L2P sub-segments L2P_MS #n_SUB #0 to L2P_MS #n_SUB #3 included in each of the plurality of L2P map segments L2P_MS #0 to L2P_MS #3. That is, each of the L2P sub-segments may include L2P map data for 5 logical addresses.

Furthermore, state information STATE_INF according to an embodiment of this disclosure may have a bitmap form. Since state information STATE_INF has a simple bitmap form (e.g., 1 or 0), a storage space occupied by the state information STATE_INF in a memory system is small, so that the burden of the memory system to access the state information STATE_INF can be reduced. Furthermore, state information STATE_INF according to an embodiment of this disclosure may have a counter form. Furthermore, state information STATE_INF according to an embodiment of this disclosure may have a flag form, a table form or a list form.

In this case, a state value of the state information STATE_INF generated at step S30 may have an initial value of "0." When the state of the map data is changed, the state value may be changed (e.g., "1").

If a memory system repeatedly transmits to a host map data that is not the latest version, overhead occurs in data communication between the memory system and the host, and efficiency may be degraded. However, referring to FIGS. 1A and 1B, whether map data transmitted from the memory system to the host has been updated or whether the map data has been used can be identified more precisely. If memory system determines timing (i.e., the retransmission of the map data) in which map data transmitted from the memory system to the host will be replaced, based on whether the map data has been updated or whether the map data has been used, unnecessary data communication between the memory system and the host can be avoided.

Figure 2:
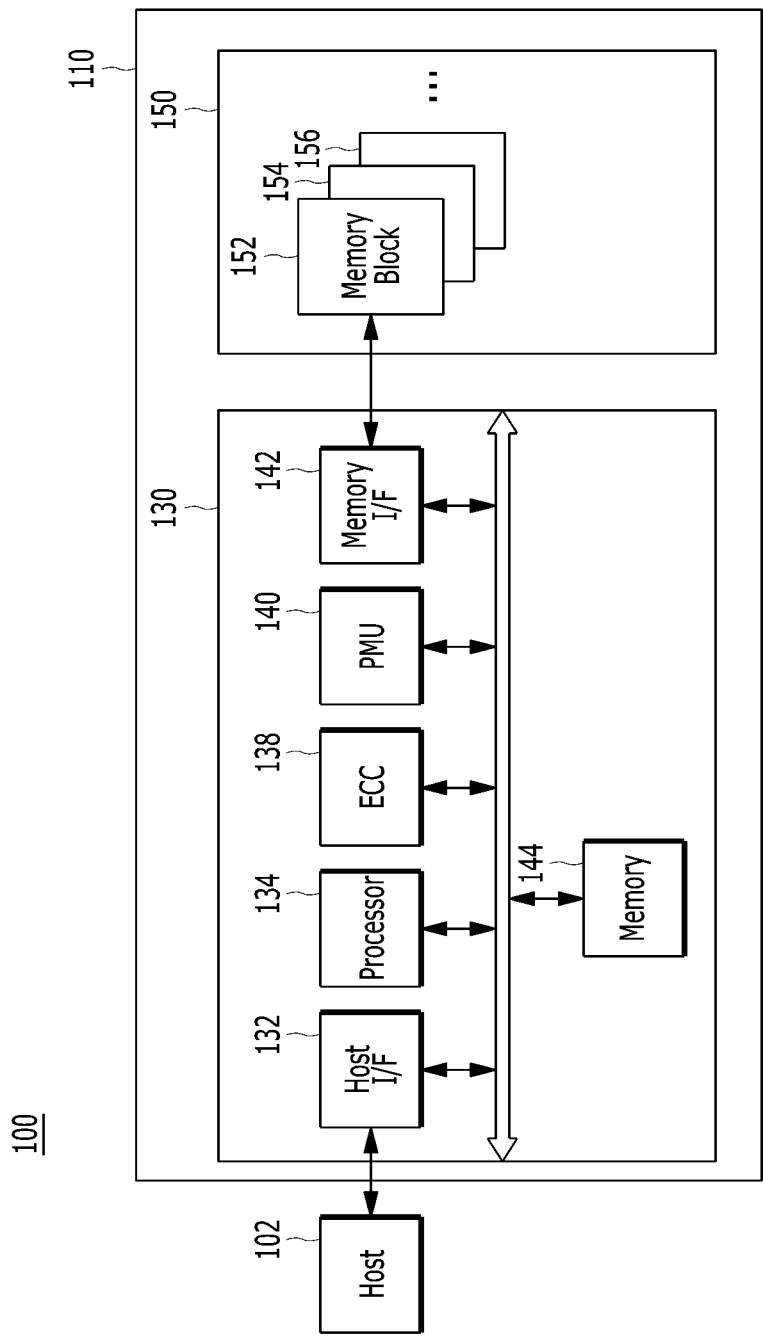
FIG. 2 is a schematic diagram illustrating a data processing system in accordance with an embodiment of the present invention.

FIG. 2 is a block diagram illustrating a data processing system 100 in accordance with an embodiment of the present invention.

Referring to FIG. 2, a data processing system 100 data processing system 100 may include a host 102 operably engaged with a memory system 110.

The host 102 may include, for example, any of various portable electronic devices such as a mobile phone, an MP3 player and a laptop computer, or an electronic device such as a desktop computer, a game player, a television (TV), a projector, and/or the like.

The host 102 also includes at least one operating system (OS), which generally manages and controls functions and operations performed in the host 102. The OS can provide interoperability between the host 102 engaged with the memory system 110 and the user of the memory system 110. The OS may support functions and operations corresponding to a user's requests. By the way of example but not limitation, the OS can be a general operating system or a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, including Windows servers, Linux, Unix, and the like. Further, the mobile operating system may include Android, iOS, Windows mobile, and the like. The mobile operating system may be subject to support services or functions for mobility (e.g., a power saving function). The host 102 may include a plurality of operating systems. The host 102 may execute multiple operating systems with the memory system 110, corresponding to a user's request. The host 102 may transmit a plurality of commands corresponding to the user's requests to the memory system 110, thereby performing operations corresponding to commands within the memory system 110.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage device(s) for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM), and/or a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in any of the various types of memory systems discussed above in the examples.

By way of example but not limitation, the controller 130 and the memory device 150 may be integrated into an SSD for improving an operation speed. When the memory system 110 is used as an SSD, the operating speed of the host 102 connected to the memory system 110 can be improved more than that of the host 102 implemented with a hard disk. In another embodiment, the controller 130 and the memory device 150 may be integrated into one semiconductor device to form a memory card, such as a PC card (PCMCIA), a compact flash card (CF), a memory card such as a smart media card (SM, SMC), a memory stick, a multimedia card (MMC, RS-MMC, MMC micro), a SD card (SD, mini SD, microSD, SDHC), a universal flash memory, or the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even without electrical power being supplied. The memory device 150 may store data provided from the host 102 through a write operation, while providing data stored therein to the host 102 through a read operation. The memory device 150 may include a plurality of memory blocks 152, 154, 156, each of which may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes a plurality of memory blocks 152, 154, 156. In addition, the memory device 150 may be a non-volatile memory device, for example a flash memory, wherein the flash memory may be embodied in a three-dimensional stack structure.

The controller 130 may control overall operations of the memory device 150, such as read, write, program, and erase operations. For example, the controller 130 may control the memory device 150 in response to a request from the host 102. The controller 130 may provide data, read from the memory device 150, to the host 102. The controller 130 may also store data, provided by the host 102, into the memory device 150.

The controller 130 may include a host interface (I/F) 132, a processor 134, an error correction code (ECC) component 138, a power management unit (PMU) 140, a memory interface (I/F) 142, and memory 144, all operatively coupled via an internal bus.

The host interface 132 may process commands and data provided by the host 102, and may communicate with the host 102 through at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI), and/or integrated drive electronics (IDE). In accordance with an embodiment, the host interface 132 is a component for exchanging data with the host 102, which may be implemented through firmware called a host interface layer (HIL).

The ECC component 138 can correct error bits of the data to be processed in (e.g., outputted from) the memory device 150, which may include an ECC encoder and an ECC decoder. Here, the ECC encoder can perform error correction encoding of data to be programmed in the memory device 150 to generate encoded data into which a parity bit is added and store the encoded data in memory device 150. The ECC decoder can detect and correct errors contained in a data read from the memory device 150 when the controller 130 reads the data stored in the memory device 150. In other words, after performing error correction decoding on the data read from the memory device 150, the ECC component 138 can determine whether the error correction decoding has succeeded and output an instruction signal (e.g., a correction success signal or a correction fail signal). The ECC component 138 can use the parity bit which is generated during the ECC encoding process, for correcting the error bit(s) of the read data. When the number of the error bits is greater than or equal to a threshold number of correctable error bits, the ECC component 138 might not correct error bits but instead may output an error correction fail signal indicating failure in correcting the error bits.

The ECC component 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), and/or a Block coded modulation (BCM). The ECC component 138 may include any and all circuits, modules, systems or devices for performing the error correction operation based on at least one of the above described codes.

The PMU 140 may manage electrical power provided in the controller 130.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface 142 can provide an interface for handling commands and data between the controller 130 and the memory device 150, for example, operations of NAND flash interface, in particular, operations between the controller 130 and the memory device 150. In accordance with an embodiment, the memory interface 142 can be implemented through firmware called a Flash Interface Layer (FIL) as a component for exchanging data with the memory device 150.

The memory 144 may support operations performed by the memory system 110 and the controller 130. The memory 144 may store temporary or transactional data generated or delivered for operations in the memory system 110 and the controller 130. The controller 130 may control the memory device 150 in response to a request from the host 102. The controller 130 may deliver data read from the memory device 150 into the host 102. The controller 130 may store data received from the host 102 in the memory device 150. The memory 144 may be used to store data for the controller 130 and the memory device 150 to perform operations such as read operations or program/write operations.

The memory 144 may be implemented as a volatile memory. The memory 144 may be implemented with a static random access memory (SRAM), a dynamic random access memory (DRAM), or both. Although FIG. 2 illustrates, for example, the second memory 144 disposed within the controller 130, embodiments are not limited thereto. That is, the memory 144 may be located within or external to the controller 130. For instance, the memory 144 may be embodied by an external volatile memory having a memory interface transferring data and/or signals between the memory 144 and the controller 130.

The memory 144 can store data necessary for performing operations such as data writing and data reading requested by the host 102 and/or data transfer between the memory device 150 and the controller 130 for background operations such as garbage collection and wear levelling as described above. In accordance with an embodiment, for supporting operations in the memory system 110, the memory 144 may include a program memory, a data memory, a write buffer/cache, a read buffer/cache, a data buffer/cache, a map buffer/cache, and the like.

The processor 134 may be implemented with a microprocessor or a central processing unit (CPU). The memory system 110 may include one or more processors 134. The processor 134 may control the overall operations of the memory system 110. By way of example but not limitation, the processor 134 controls a program operation or a read operation of the memory device 150, in response to a write request or a read request entered from the host 102. In accordance with an embodiment, the processor 134 may use or execute firmware to control the overall operations of the memory system 110. Herein, the firmware may be referred to as a flash translation layer (FTL). The FTL may perform an operation as an interface between the host 102 and the memory device 150. The host 102 may transmit requests for write and read operations to the memory device 150 through the FTL.

The FTL may manage operations of address mapping, garbage collection, wear-leveling, and the like. Particularly, the FTL may load, generate, update, or store map data. Therefore, the controller 130 may map a logical address, which is entered from the host 102, with a physical address of the memory device 150 through the map data. The memory device 150 may operate like a general storage device to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the previous particular page to the another newly programed page) due to a characteristic of a flash memory device. Further, the controller 130 may store map data of the new data into the FTL.

For example, when performing an operation requested from the host 102 in the memory device 150, the controller 130 uses the processor 134. The processor 134 engaged with the memory device 150 can handle instructions or commands corresponding to a command received from the host 102. The controller 130 can perform a foreground operation as a command operation, corresponding to an command received from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 through the processor 134. By way of example but not limitation, the background operation for the memory device 150 includes copying data stored in a memory block among the memory blocks 152, 154, 156 and storing such data in another memory block, e.g., a garbage collection (GC) operation. The background operation can include moving data stored in at least one of the memory blocks 152, 154, 156 into at least another of the memory blocks 152, 154, 156, e.g., a wear leveling (WL) operation. During a background operation, the controller 130 may use the processor 134 for storing the map data stored in the controller 130 to at least one of the memory blocks 152, 154, 156 in the memory device 150, e.g., a map flush operation. A bad block management operation of checking or searching for bad blocks among the memory blocks 152, 154, 156 is another example of a background operation performed by the processor 134.

In the memory system 110, the controller 130 performs a plurality of command operations corresponding to a plurality of commands entered from the host 102. For example, when performing program operations corresponding to program commands, read operations corresponding to read commands, and erase operations corresponding to erase commands, such operations may be performed sequentially, i.e., in groups of particular type of command, randomly, or alternately, i.e., alternate between the different types of commands, the controller 130 can determine which channel(s) or way(s) among a plurality of channels or ways for connecting the controller 130 to a plurality of memory dies included in the memory 150 is/are proper or appropriate for performing each operation. The controller 130 can transmit or transmit data or instructions via determined channels or ways for performing each operation. The plurality of memory dies in the memory 150 can transmit an operation result via the same channels or ways, respectively, after each operation is complete. Then, the controller 130 may transmit a response or an acknowledge signal to the host 102. In an embodiment, the controller 130 can check a status of each channel or each way. In response to a command entered from the host 102, the controller 130 may select at least one channel or way based on the status of each channel or each way so that instructions and/or operation results with data may be delivered via selected channel(s) or way(s).

By way of example but not limitation, the controller 130 can recognize statuses regarding a plurality of channels (or ways) associated with a plurality of memory dies included in the memory device 150. The controller 130 may determine the state of each channel or each way as a busy state, a ready state, an active state, an idle state, a normal state, and/or an abnormal state. The controller's determination of which channel or way an instruction (and/or a data) is delivered through can be associated with a physical block address, e.g., which die(s) the instruction (and/or the data) is delivered into. The controller 130 can refer to descriptors delivered from the memory device 150. The descriptors can include a block or page of parameters that describe relevant information about the memory device 150. For instance, the descriptors may include device descriptors, configuration descriptors, unit descriptors, and the like. Each descriptor is data which may have a set format or structure. The controller 130 can refer to, or use, the descriptors to determine via which channel(s) or way(s) an instruction or a data is exchanged.

A management unit (not shown) may be included in the processor 134. The management unit may perform bad block management of the memory device 150. The management unit may find bad memory blocks in the memory device 150, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Figure 3:
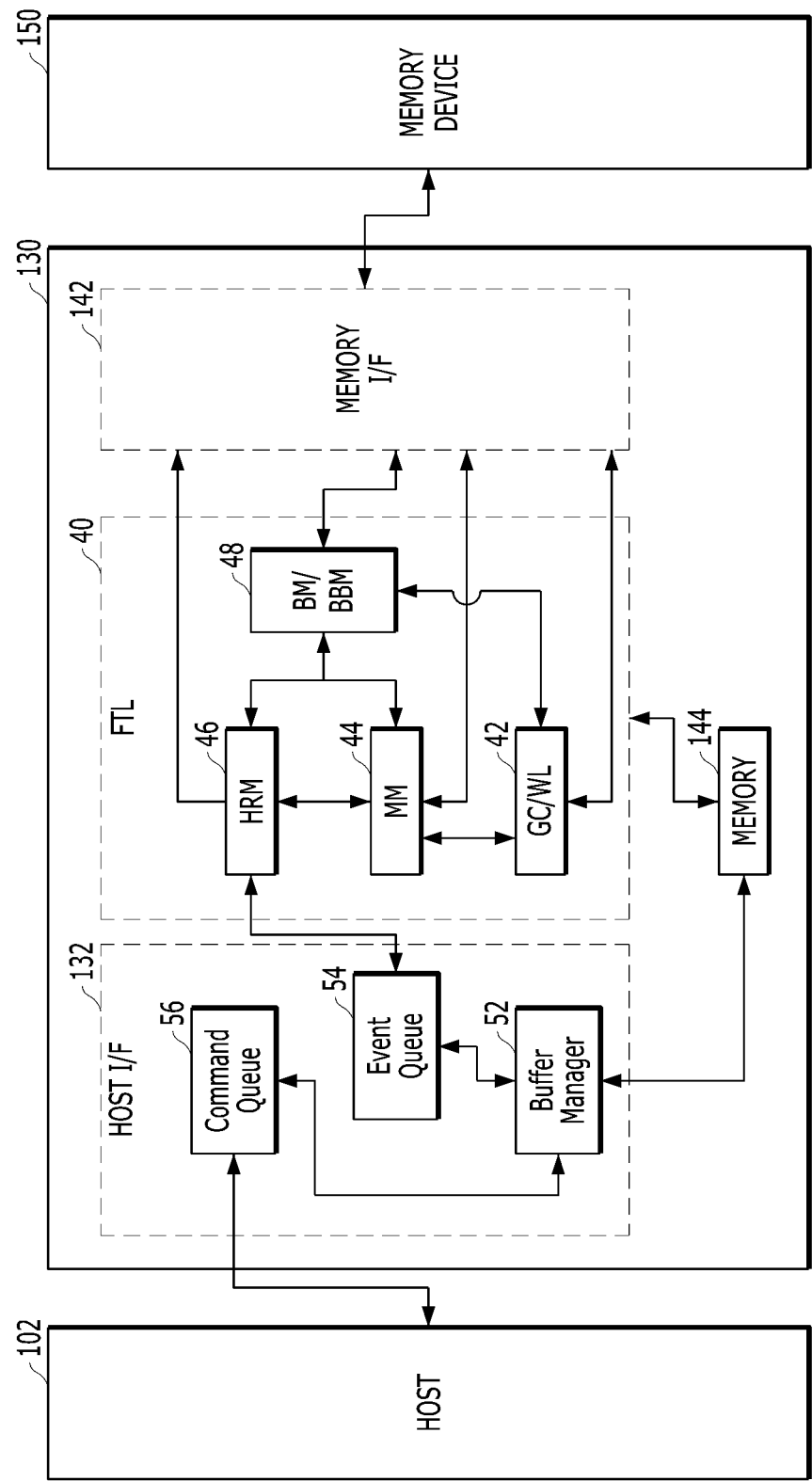
FIG. 3 is a schematic diagram illustrating a data processing system in accordance with another embodiment of the present invention.

Referring to FIG. 3, a controller in a memory system in accordance with another embodiment of the present disclosure is described. The controller 130 cooperates with the host 102 and the memory device 150. As illustrated, the controller 130 includes a host interface 132, a flash translation layer (FTL) 40, as well as the host interface 132, the memory interface 142, and the memory 144 previously identified in connection with FIG. 2.

Although not shown in FIG. 3, in accordance with an embodiment, the ECC component 138 described with reference to FIG. 2 may be included in the flash translation layer (FTL) 40. In another embodiment, the ECC component 138 may be implemented as a separate module, a circuit, firmware, or the like, which is included in, or associated with, the controller 130.

The host interface 132 is for handling commands, data, and the like transmitted from the host 102. By way of example but not limitation, the host interface 132 may include a command queue 56, a buffer manager 52, and an event queue 54. The command queue 56 may sequentially store commands, data, and the like received from the host 102 and output them to the buffer manager 52 in an order in which they are stored. The buffer manager 52 may classify, manage, or adjust the commands, the data, and the like, which are received from the command queue 56. The event queue 54 may sequentially transmit events for processing the commands, the data, and the like received from the buffer manager 52.

A plurality of commands or data of the same characteristic, e.g., read or write commands, may be transmitted from the host 102, or commands and data of different characteristics, e.g., types, may be transmitted to the memory system 110 after being mixed or jumbled by the host 102. For example, a plurality of commands for reading data (read commands) may be transmitted, or commands for reading data (read command) and programming/writing data (write command) may be alternately transmitted to the memory system 110. The host interface 132 may store commands, data, and the like, which are transmitted from the host 102, to the command queue 56 sequentially. Thereafter, the host interface 132 may estimate or predict what kind of internal operation the controller 130 will perform according to the characteristics of commands, data, and the like, which have been entered from the host 102. The host interface 132 can determine a processing order and a priority of commands, data and the like, based at least on their characteristics. According to characteristics of commands, data, and the like transmitted from the host 102, the buffer manager 52 in the host interface 132 is configured to determine whether the buffer manager should store commands, data, and the like in the memory 144, or whether the buffer manager should deliver the commands, the data, and the like to the flash translation layer (FTL) 40. The event queue 54 receives events, entered from the buffer manager 52, which are to be internally executed and processed by the memory system 110 or the controller 130 in response to the commands, the data, and the like transmitted from the host 102, so as to deliver the events into the flash translation layer (FTL) 40 in the order received.

Figure 6:
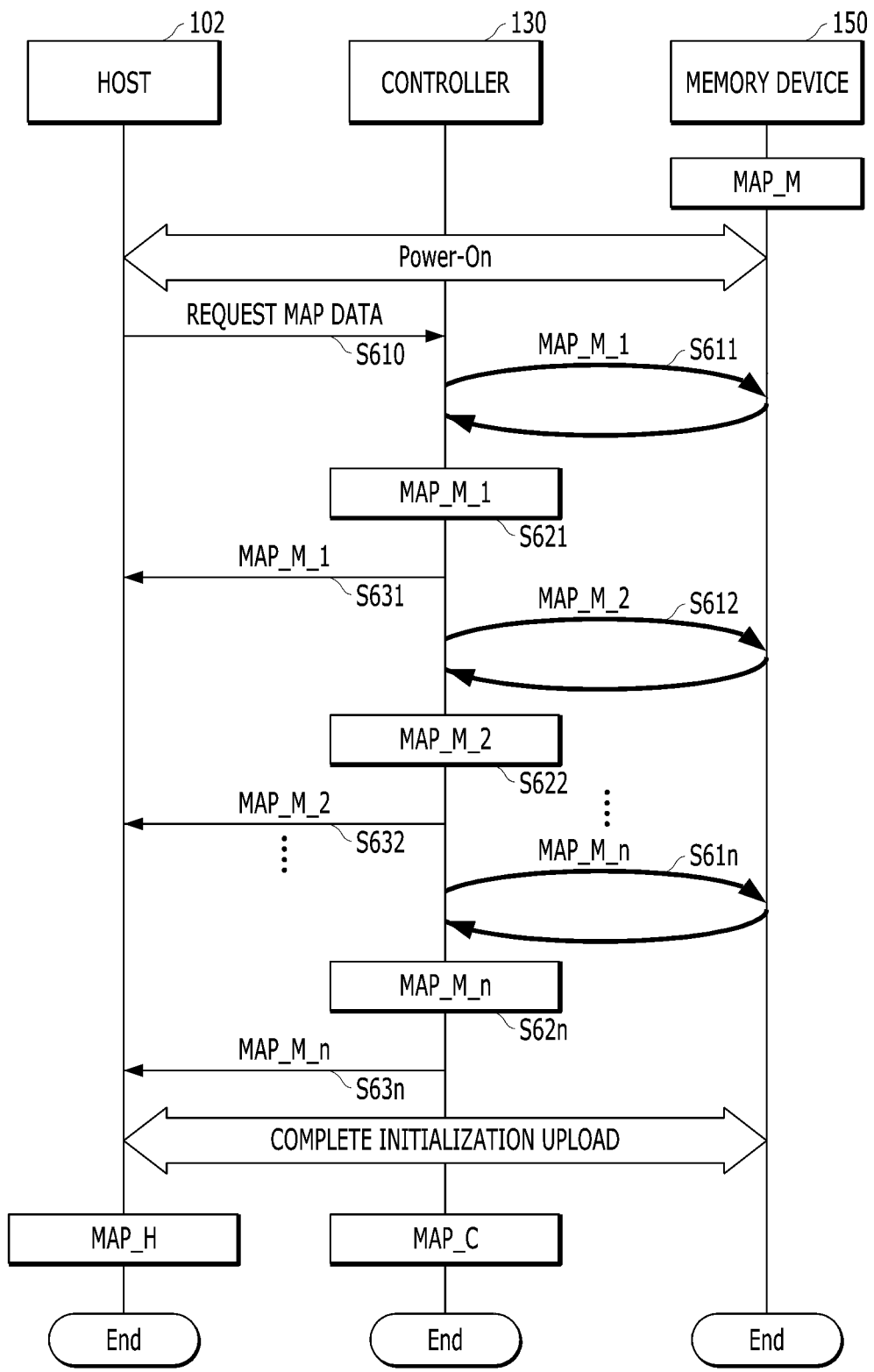
FIG. 6 is a flowchart illustrating a process of initially uploading map data.

In accordance with an embodiment, the host interface 132 described with reference to FIG. 3 may perform some functions of the controller 130 described with reference to FIGS. 1 and 2. The host interface 132 may set the host memory 106, which is shown in FIG. 6 or 9, as a slave and add the host memory 106 as an additional storage space which is controllable or usable by the controller 130.

In accordance with an embodiment, the flash translation layer (FTL) 40 can include a host request manager (HRM) 46, a map manager (MM) 44, a state manager (GC/WL) 42, and a block manager (BM/BBM) 48. The host request manager 46 can manage the events entered from the event queue 54. The map manager 44 can handle or control a map data. The state manager 42 can perform garbage collection (GC) or wear leveling (WL). The block manager 48 can execute commands or instructions onto a block in the memory device 150.

By way of example but not limitation, the host request manager) 46 can use the map manager 44 and the block manager 48 to handle or process requests according to the read and program commands, and events which are delivered from the host interface 132. The host request manager 46 can transmit an inquiry request to the map data manager 44, to determine a physical address corresponding to the logical address which is entered with the events. The host request manager 46 can transmit a read request with the physical address to the memory interface 142, to process the read request (handle the events). On the other hand, the host request manager 46 can transmit a program request (write request) to the block manager 48, to program data to a specific empty page (a page with no data) in the memory device 150, and then, can transmit a map update request corresponding to the program request to the map manager 44, to update an item relevant to the programmed data in information of mapping the logical-physical addresses to each other.

Here, the block manager 48 can convert a program request delivered from the host request manager 46, the map data manager 44, and/or the state manager 42 into a flash program request used for the memory device 150, to manage flash blocks in the memory device 150. In order to maximize or enhance program or write performance of the memory system 110 (see FIG. 2), the block manager 48 may collect program requests and transmit flash program requests for multiple-plane and one-shot program operations to the memory interface 142. In an embodiment, the block manager 48 transmits several flash program requests to the memory interface 142 to enhance or maximize parallel processing of the multi-channel and multi-directional flash controller.

On the other hand, the block manager 48 can be configured to manage blocks in the memory device 150 according to the number of valid pages, select and erase blocks having no valid pages when a free block is needed, and select a block including the least number of valid pages when it is determined that garbage collection is necessary. The state manager 42 can perform garbage collection to move the valid data to an empty block and erase the blocks containing the moved valid data so that the block manager 48 may have enough free blocks (empty blocks with no data). If the block manager 48 provides information regarding a block to be erased to the state manager 42, the state manager 42 may check all flash pages of the block to be erased to determine whether each page is valid. For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 transmits a program request to the block manager 48 for each valid page. A mapping table can be updated through the update of the map manager 44 when the program operation is complete.

The map manager 44 can manage a logical-physical mapping table. The map manager 44 can process requests such as queries, updates, and the like, which are generated by the host request manager 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may transmit a read request to the memory interface 142 to load a relevant mapping table stored in the memory device 150. When the number of dirty cache blocks in the map manager 44 exceeds a certain threshold, a program request can be sent to the block manager 48 so that a clean cache block is made and the dirty map table may be stored in the memory device 150.

On the other hand, when garbage collection is performed, the state manager 42 copies valid page(s) into a free block, and the host request manager 46 can program the latest version of the data for the same logical address of the page and currently issue an update request. When the status manager 42 requests the map update in a state in which copying of valid page(s) is not properly completed, the map manager 44 might not perform the mapping table update. It is because the map request is issued with old physical information if the status manger 42 requests a map update and a valid page copy is completed later. The map manager 44 may perform a map update operation to ensure accuracy only if the latest map table still points to the old physical address.

In accordance with an embodiment, at least one of the state manager 42, the map manager 44, or the block manager 48 can include circuitry for performing its own operation. As used in the present disclosure, the term 'circuitry' refers to any and all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" also covers an implementation of merely a processor (or multiple processors) or portion of a processor and its (or their) accompanying software and/or firmware. The term "circuitry" also covers, for example, and if applicable to a particular claim element, an integrated circuit for a storage device.

The memory device 150 can include a plurality of memory blocks. The plurality of memory blocks can be any of different types of memory blocks such as single-level cell (SLC) memory blocks, multi-level cell (MLC) memory blocks, or the like, according to the number of bits that can be stored or represented in one memory cell. Here, the SLC memory block includes a plurality of pages implemented by memory cells each storing one bit of data. The SLC memory block can have high data I/O operation performance and high durability. The MLC memory block includes a plurality of pages implemented by memory cells each storing multi-bit data (e.g., two bits or more). The MLC memory block can have larger storage capacity for the same space compared to the SLC memory block. The MLC memory block can be highly integrated in terms of storage capacity. In an embodiment, the memory device 150 may be implemented with different levels of MLC memory blocks, such as a double-level memory block, a triple-level cell (TLC) memory block, a quadruple-level cell (QLC) memory block, or a combination thereof. The double-level memory block may include a plurality of pages implemented by memory cells, each capable of storing 2-bit data. The triple-level cell (TLC) memory block can include a plurality of pages implemented by memory cells, each capable of storing 3-bit data. The quadruple-level cell (QLC) memory block can include a plurality of pages implemented by memory cells, each capable of storing 4-bit data. In another embodiment, the memory device 150 can be implemented with a block including a plurality of pages implemented by memory cells, each capable of storing five or more bits of data.

In an embodiment of the present disclosure, the memory device 150 is embodied as nonvolatile memory such as a flash memory such as a NAND flash memory, a NOR flash memory, and the like. Alternatively, the memory device 150 may be implemented by at least one of a phase change random access memory (PCRAM), a ferroelectrics random access memory (FRAM), a spin injection magnetic memory (SU-RAM), and a spin transfer torque magnetic random access memory (STT-MRAM), or the like.

Figure 4:
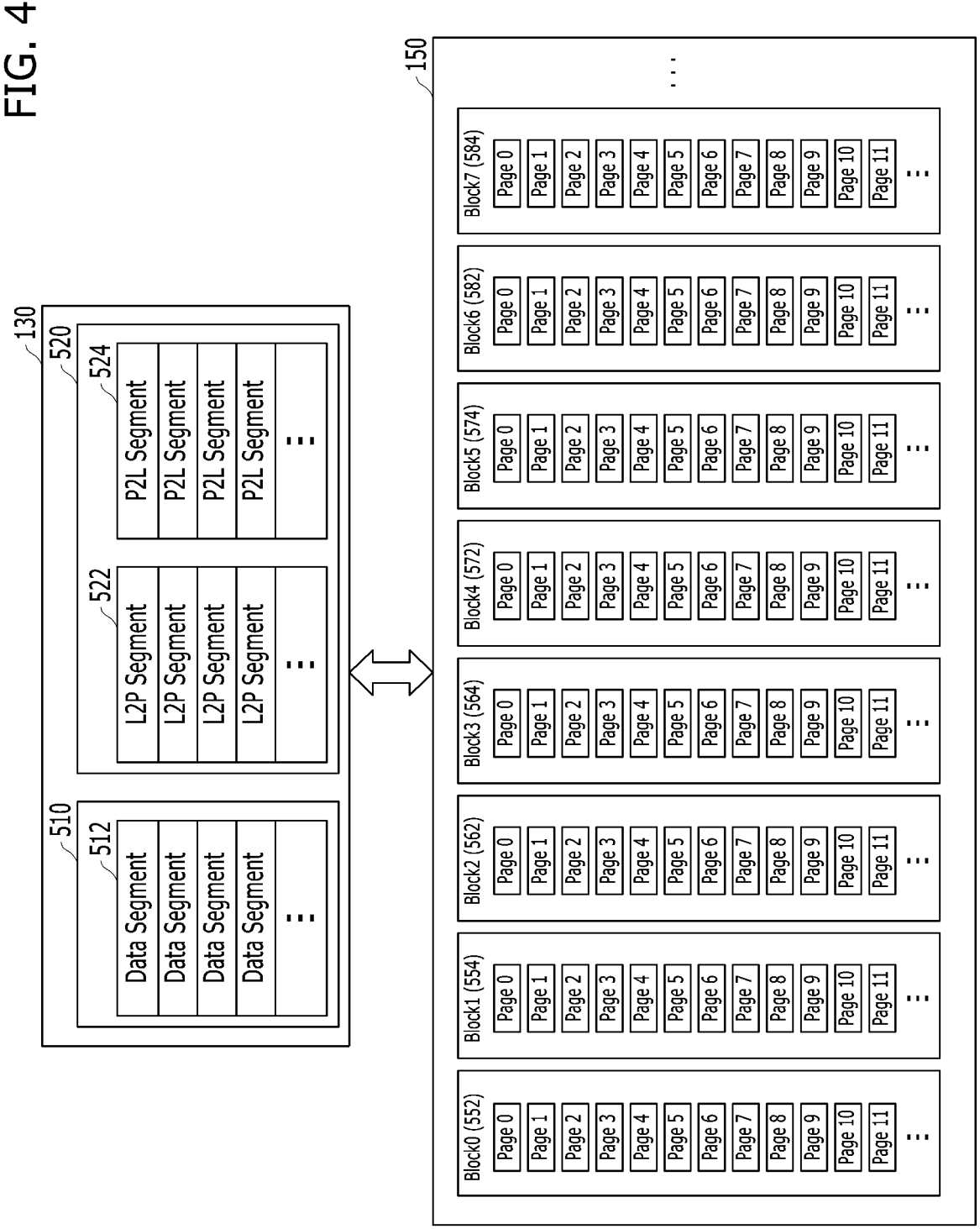
FIG. 4 is a schematic diagram illustrating a data processing operation in a memory system in accordance with an embodiment of the present invention.

FIG. 4 is a schematic diagram illustrating a data processing operation with respect to a memory device in a memory system in accordance with an embodiment.

Referring to FIG. 4, the controller 130 may perform a command operation corresponding to a command received from the host 102, for example, a program operation corresponding to a write request. The controller 130 may write and store user data corresponding to the write request, in memory blocks 552, 554, 562, 564, 572, 574, 582 and 584 of the memory device 150. Also, in correspondence to the write operation to those memory blocks, the controller 130 may generate and update meta data for the user data and write and store the meta data in these memory blocks.

The controller 130 may generate and update information indicating that the user data are stored in the pages in the memory blocks 552, 554, 562, 564, 572, 574, 582 and 584 of the memory device 150, that is, generate and update the logical segments, that is, L2P segments, of first map data and the physical segments, that is, P2L segments, of second map data, and then, store the L2P segments and the P2L segments in the pages of the memory blocks 552, 554, 562, 564, 572, 574, 582 and 584, by performing a map flush operation.

For example, the controller 130 may cache and buffer the user data corresponding to the write request received from the host 102, in a first buffer 510 in the memory 144 of the controller 130, that is, store data segments 512 of the user data in the first buffer 510 as a data buffer/cache. Then, the controller 130 may write and store the data segments 512 stored in the first buffer 510, in the pages in the memory blocks 552, 554, 562, 564, 572, 574, 582 and 584 of the memory device 150.

As the data segments 512 of the user data corresponding to the write request received from the host 102 are written and stored in the pages in the above-identified memory blocks, the controller 130 may generate the first map data and the second map data, and store the first map data and the second map data in a second buffer 520 in the memory 144.

More specifically, the controller 130 may store L2P segments 522 of the first map data for the user data and P2L segments 524 of the second map data for the user data, in the second buffer 520 as a map buffer/cache. In the second buffer 520 in the memory 144 of the controller 130, there may be stored, as described above, the L2P segments 522 of the first map data and the P2L segments 524 of the second map data, or there may be stored a map list for the L2P segments 522 of the first map data and a map list for the P2L segments 524 of the second map data. The controller 130 may write and store the L2P segments 522 of the first map data and the P2L segments 524 of the second map data, which are stored in the second buffer 520, in the pages in the memory blocks 552, 554, 562, 564, 572, 574, 582 and 584 of the memory device 150.

Also, the controller 130 may perform a command operation corresponding to a command received from the host 102, for example, a read operation corresponding to a read request. The controller 130 may load user data corresponding to the read request, for example, L2P segments 522 of first map data and P2L segments 524 of second map data, in the second buffer 520, and check the L2P segments 522 and the P2L segments 524. After that, the controller 130 may read the user data stored in the pages included in corresponding memory blocks among the memory blocks 552, 554, 562, 564, 572, 574, 582 and 584 of the memory device 150, store data segments 512 of the read user data in the first buffer 510, and provide the data segments 512 to the host 102.

Figure 5:
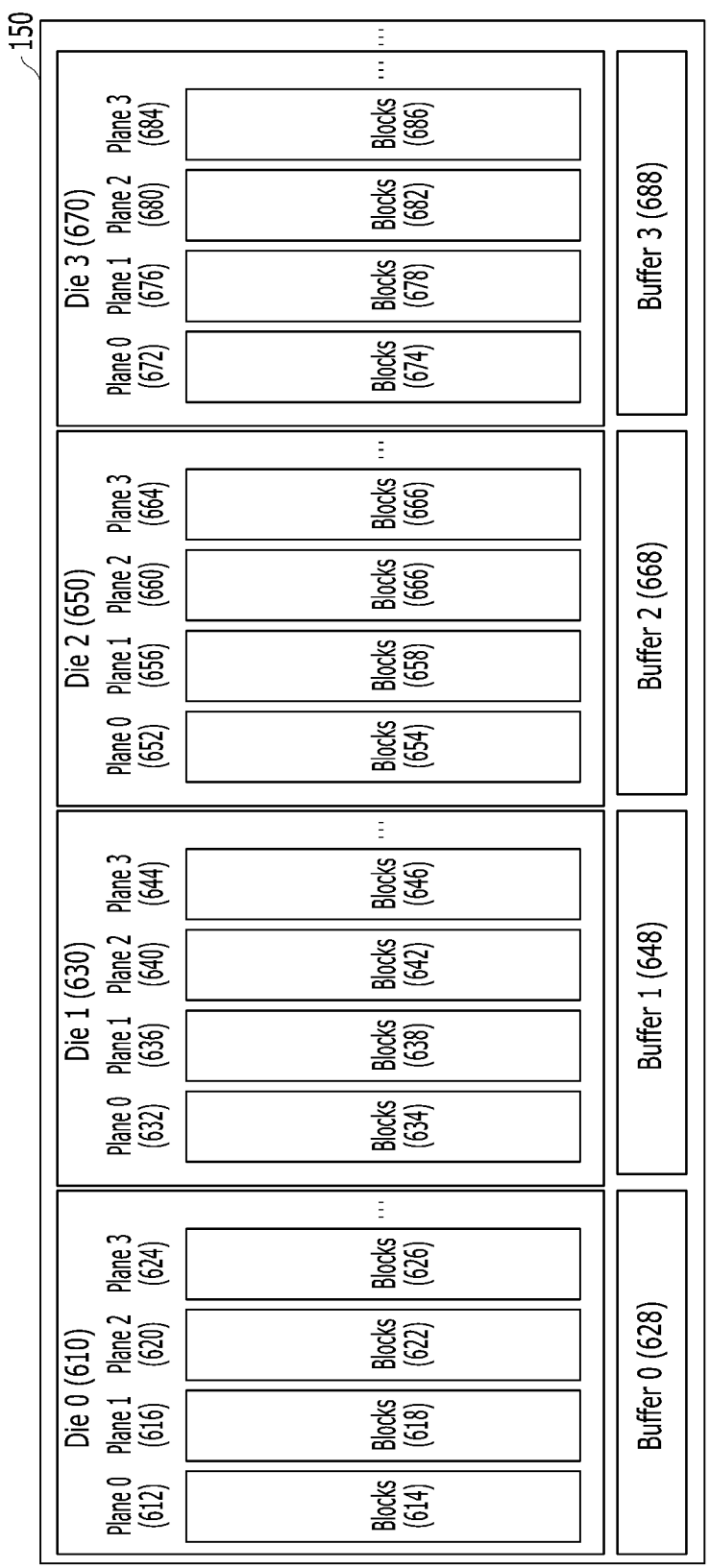
FIG. 5 is a schematic diagram illustrating a memory device in accordance with an embodiment of the present invention.

Referring to FIG. 5, the memory device 150 may include a plurality of memory dies, for example, memory dies 610, 630, 650 and 670. Each of the memory dies 610, 630, 650 and 670 may include a plurality of planes. For example, the memory die 610 may include planes 612, 616, 620 and 624. The memory die 630 may include planes 632, 636, 640 and 644. The memory die 650 may include planes 652, 656, 660 and 664, and the memory die 670 may include planes 672, 676, 680 and 684. The planes 612, 616, 620, 624, 632, 636, 640, 644, 652, 656, 660, 664, 672, 676, 680 and 684 may include a plurality of memory blocks 614, 618, 622, 626, 634, 638, 642, 646, 654, 658, 662, 666, 6 74, 678, 682 and 686, respectively. Each block may include a plurality of pages, for example, $2^M$ pages, as described above with reference to FIG. 3. The plurality of memory dies of the memory device 150 may be grouped and memory dies in the same group coupled to the same channel. For example, the memory dies 610 and 650 may be coupled to one channel, and the memory dies 630 and 670 may be coupled to a different channel.

In an embodiment of the present disclosure, in consideration of program sizes in the memory blocks 614, 618, 622, 626, 634, 638, 642, 646, 654, 658, 662, 666, 6 74, 678, 682 and 686 of the respective planes 612, 616, 620, 624, 632, 636, 640, 644, 652, 656, 660, 664, 672, 676, 680 and 684 in the memory dies 610, 630, 650 and 670 of the memory device 150 as described above with reference to FIG. 5, user data and meta data of a command operation corresponding to a command received from the host 102 may be written and stored in the pages in select memory blocks. In particular, after grouping these memory blocks into a plurality of super memory blocks, user data and meta data of a command operation corresponding to a command received from the host 102 may be written and stored in the super memory blocks, for example, through a one shot program.

Each of the super memory blocks may include a plurality of memory blocks, for example, at least one memory block of a first memory block group and at least one memory block of a second memory block group. The first memory block group may contain memory blocks of a first die, and the second memory block group may contain memory blocks of a second die, where the first and second dies are coupled to different channels. Further, a plurality of memory blocks, for example, a first memory block and a second memory block, in a first memory block group coupled to a first channel may be of memory dies coupled to different ways of a channel, and a plurality of memory blocks, for example, a third memory block and a fourth memory block, in a second memory block group coupled to a second channel may be of memory dies coupled to different ways of a channel.

For example, a first super memory block may include four memory blocks, each of a different die, where two of the dies are coupled to one channel and the other two dies are coupled to a different channel. While it is described above that one super memory block includes 4 memory blocks, a super memory block may include any suitable number of memory blocks. For example, a super block may include only 2 memory blocks, each of dies coupled to separate channels.

In an embodiment of the present disclosure, in performing a program operation in the super memory blocks in the memory device 150, data segments of user data and meta segments of meta data for the user data may be stored in the plurality of memory blocks in the respective super memory blocks, through an interleaving scheme, in particular, a channel interleaving scheme, a memory die interleaving scheme or a memory chip interleaving scheme. To this end, the memory blocks in the respective super memory blocks may be of different memory dies, in particular, memory blocks of different memory dies coupled to different channels.

Moreover, in an embodiment of the present disclosure, in the case where, as described above, a first super memory block may include 4 memory blocks of 4 memory dies coupled to 2 channels, in order to ensure that a program operation is performed through a channel interleaving scheme and a memory die interleaving scheme, the first page of the first super memory block corresponds to the first page of a first memory block, the second page next to the first page of the first super memory block corresponds to the first page of a second memory block, the third page next to the second page of the first super memory block corresponds to the first page of a third memory block, and the fourth page next to the third page of the first super memory block corresponds to the first page of a fourth memory block. In an embodiment of the present disclosure, the program operation may be performed sequentially from the first page of the first super memory block.

Figure 7:
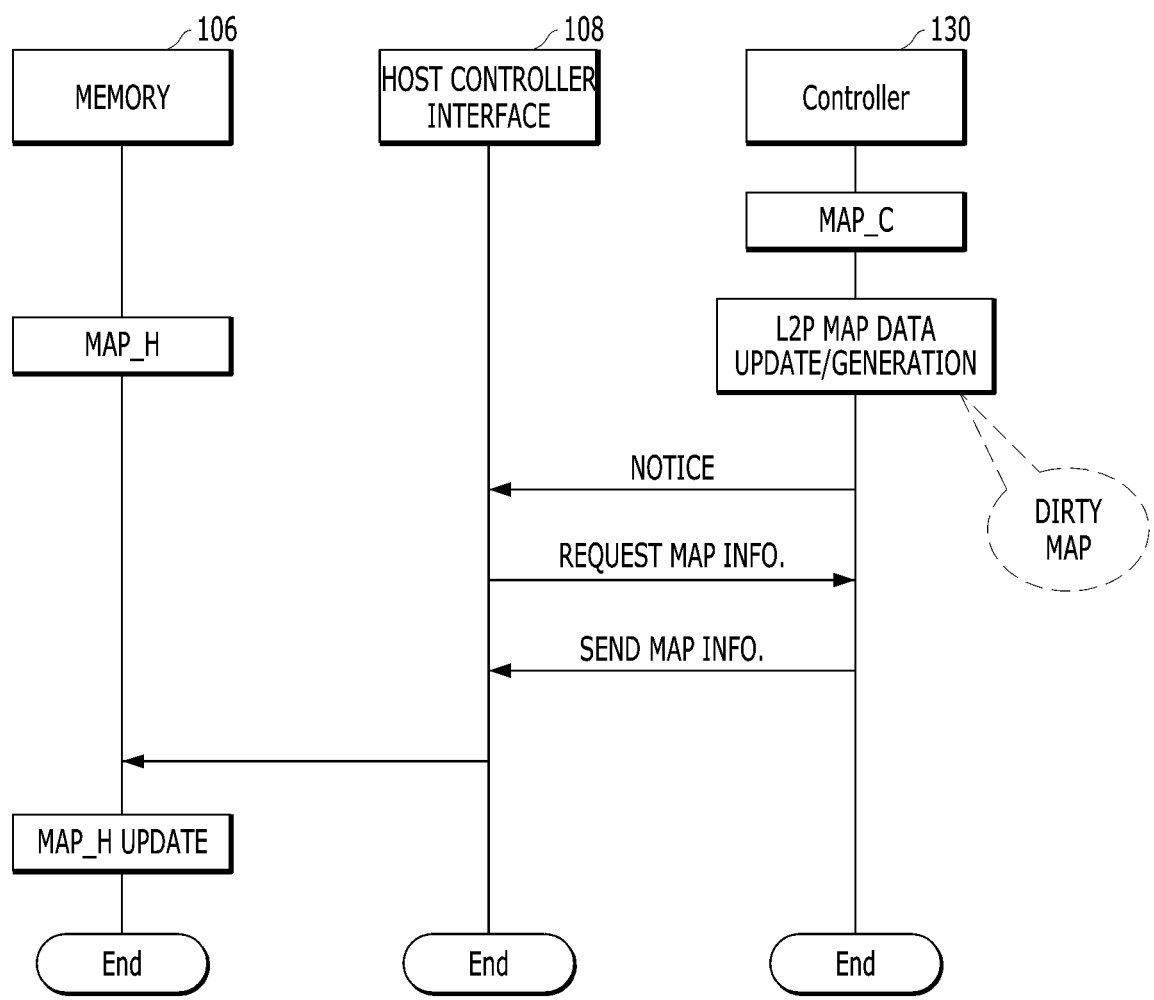
FIG. 7 is a block and flow diagram illustrating a process of updating map data.

FIGS. 5 to 7 illustrate a case in which a part or portion of memory in a host can be used as a cache device for storing meta data used in the memory system.

FIG. 6 is a flowchart illustrating a method in which the memory system 110 transmits all or a portion of the memory map data MAP_M to the host 102 at power-on. Referring to FIG. 6, the controller 130 loads some or all of a memory map data MAP_M stored in the memory device 150 and transmits memory map data MAP_M to the host 102 at power-on. Upon power-on, the host 102, the controller 130, and the memory device 150 may start an initialization uploading operation of a map data.

In S610, the host 102 may request map data from the controller 130. For example, the host 102 may designate and request a specific portion of the map data, e.g., data needed to drive the data processing system 100, such as a file system, a boot image, and an operating system, is stored. As another example, the host 102 may request map data from the controller 130 without any designation.

In S611, the controller 130 may read a first portion MAP_M_1 of the memory map data MAP_M from the memory device 150. In S621, the first portion MAP_M_1 may be stored in the controller 130 as the controller map data MAP_C. In S631, the controller 130 may transmit the first portion MAP_M_1, which is stored as the controller map data MAP_C, to the host 102. The first portion MAP_M_1 may be stored in the host memory 106 as the host map data MAP_H.

In S612, the controller 130 may read a second portion MAP_M_2 of the memory map data MAP_M from the memory device 150. In S622, the second portion MAP_M_2 may be stored in the controller 130 as the controller map data MAP_C. In S632, the controller 130 may transmit the second portion MAP_M_2, which is stored as the controller map data MAP_C, to the host 102. The second portion MAP_M_2 may be stored in the host memory 106 as the host map data MAP_H, by the host 102.

The process continues in this sequence. Thus, in S61$n$, the controller 130 may read an $n^{th}$ portion MAP_M_n of the memory map data MAP_M from the memory device 150. In S62$n$, the $n^{th}$ portion MAP_M_n may be stored in the controller 130 as the controller map data MAP_C. In S63$n$, the controller 130 may transmit the $n^{th}$ portion MAP_M_n, which is stored as the controller map data MAP_C, to the host 102. The $n^{th}$ portion MAP_M_n may be stored in the host memory 106 as the host map data MAP_H, by the host 102. Consequently, the host 102, the controller 130, and the memory device 150 may complete initialization upload of the map data.

The controller 130 in FIG. 6 downloads a part of the memory map data MAP_M a plurality of times and uploads the downloaded memory map data MAP_M to the host 102 a plurality of times in response to a single request of map data received from the host 102 in S610. However, the controller 130 may upload all of the memory map data MAP_M to the host 102 in response to a single request of map data received from the host 102. Alternatively, the controller 130 may upload the memory map data MAP_M to the host 102 in parts or pieces in succession in response to respective requests from the host 102.

As described above, the controller map data MAP_C is stored in the memory 144 of the controller 130, and the host map data MAP_H is stored in the host memory 106 of the host 102. Accordingly, at least one of the memory map data MAP_M or the controller map data MAP_C which may be referred to as a system segment and the host map data MAP_H may be referred to as a host segment.

If the initialization uploading of the map data is completed, the host 102 may cooperate with the memory system 110 and start accessing the memory system 110. An example is illustrated in FIG. 6 as the host 102 and the memory system 110 perform the initialization upload. However, the present invention is not limited to that specific configuration or processing. For example, the initialization upload may be omitted. The host 102 may gain access to the memory system 110 without the initialization upload.

After the map data initial uploading operation, uploading and updating the memory map data MAP_M may be performed in response to a host request or may be performed under the control of the controller 130 without a host request. The uploading and updating operation of the memory map data MAP_M may be performed in part or in whole, and may be performed at different times, e.g., periodically.

Figure 8:
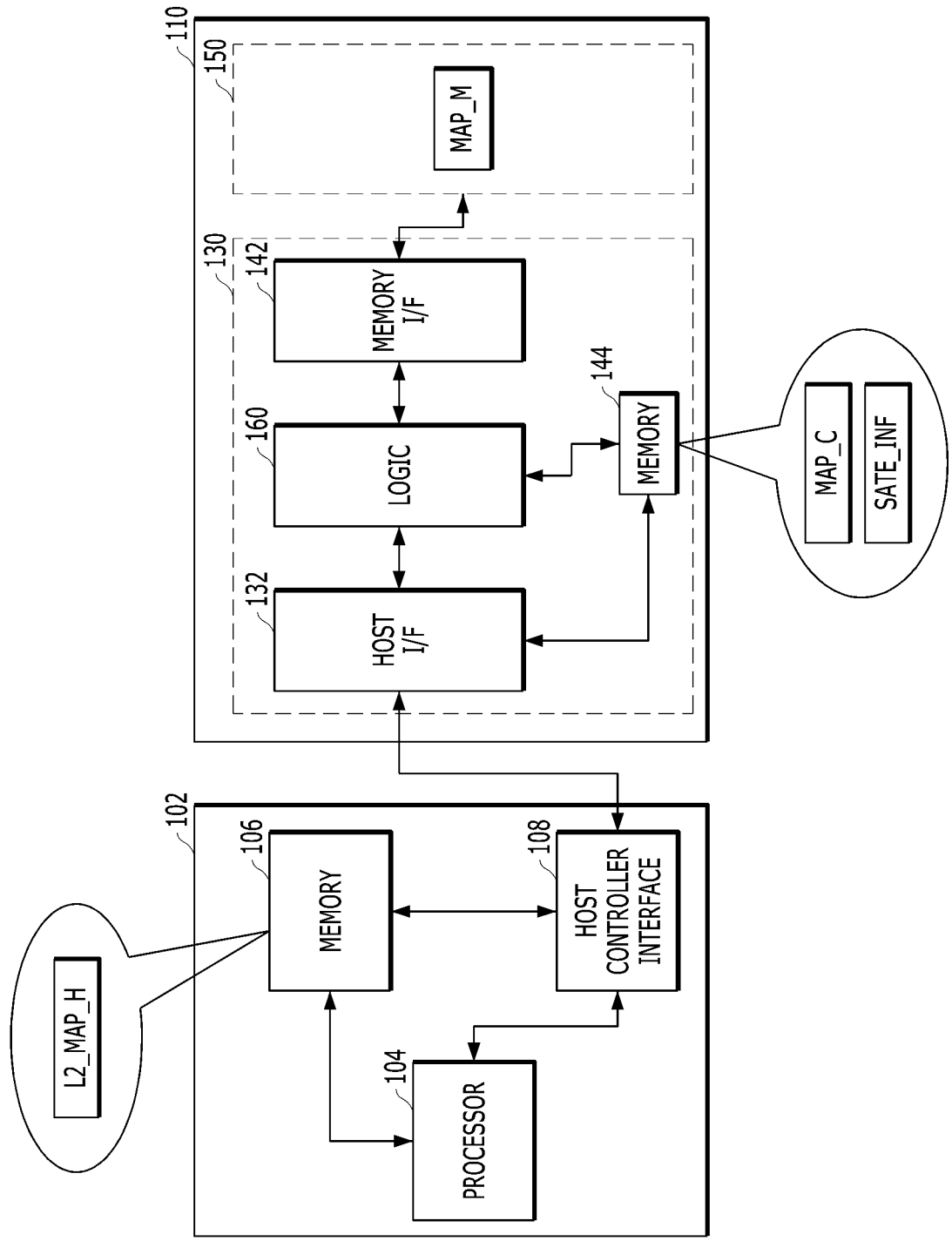
FIG. 8 illustrates a read operation of a host and a memory system in a data processing system according to an embodiment of the present invention.

FIG. 7 is a block and flow diagram illustrating an example of the map update operation performed by the data processing system illustrated in FIG. 8. Particularly, FIG. 7 illustrates a process of periodically uploading memory map data MAP_M to the host 102, and updating the host map data MAP_H which is meta data stored in the host memory 106, under the control of the controller 130.

The memory system 110 operably engaged with the host 102 may perform a read operation, an erase operation and a write operation of data requested by the host 102. After performing the read, erase and write operations of the data requested by the host 102, the memory system 110 may update the meta data when a change in the position of the data in the memory device 150 occurs.

The memory system 110 may update the meta data in response to such change in a process of performing a background operation, for example, a garbage collection operation or a wear-leveling operation, even without the request of the host 102. The controller 130 in the memory system 110 may detect whether the meta data is updated through the above-described operation. In other words, the controller 130 may detect that the meta data has become dirty (i.e., dirty map) while the meta data is generated, updated, erased, etc., and reflect the dirty map in dirty information.

When the meta data gets dirty, the controller 130 transmits a notice, informing of the need to update the host map data MAP_H, to the host controller interface 108. In this case, the notice may be periodically transmitted at regular time intervals or transmitted according to how dirty the meta data has become.

In response to the notice received from the controller 130, the host controller interface 108 may transmit a request for the host map data MAP_H that needs to be updated, to the controller 130 (i.e., request map information). In this case, the host controller interface 108 may designate and request only a portion of the host map data MAP_H that needs to be updated or request all of the host map data MAP_H.

The controller 130 may transmit the meta data, that needs to be updated, in response to the request of the host controller interface 108 (i.e., transmit map information). The host controller interface 108 may transmit the transmitted meta data to the host memory 106, and update the stored host map data MAP_H (i.e., L2P map update).

The memory map data MAP_M stored in the memory device 150 may include mapping information between the physical address PA and the logical address LA of the nonvolatile memory element in the memory device 150 where MAP_M is stored. The memory map data MAP_M may be managed in units of map segments MS. Each of the map segments MS may include a plurality of entries, and each of the entries may include mapping information between consecutive logical addresses LA and consecutive physical addresses PA.

Referring to FIG. 8, the host 102 may include a processor 104, host memory 106, and a host controller interface 108. The memory system 110 may include a controller 130 and a memory device 150. Herein, the controller 130 and the memory device 150 described with reference to FIG. 8 may correspond to the controller 130 and the memory device 150 described with reference to FIGS. 1 to 2.

FIG. 8 illustrates certain differences with respect to the data processing system shown in FIGS. 1 and 2. Particularly, a logic block 160 in the controller 130 may correspond to the flash translation layer (FTL) 40 described with reference to FIG. 3. However, according to an embodiment, the logic block 160 in the controller 130 may perform an additional function that the flash translation layer (FTL) 40 of FIG. 3 may not perform.

The host 102 may include the processor 104, which has a higher performance than that of the memory system 110. The host 102 also includes the host memory 106 which is capable of storing a larger amount of data than that of the memory system 110 that cooperates with the host 102. The processor 104 and the host memory 106 in the host 102 have an advantage in terms of space and upgradability. For example, the processor 104 and the host memory 106 have less of a space limitation than the processor 134 and the memory 144 in the memory system 110. The processor 104 and the host memory 106 may be replaceable with upgraded versions, which is different than the processor 134 and the memory 144 in the memory system 110. In the embodiment of FIG. 8, the memory system 110 can utilize the resources of the host 102 in order to increase the operation efficiency of the memory system 110.

As an amount of data which can be stored in the memory system 110 increases, an amount of meta data corresponding to the data stored in the memory system 110 also increases. When storage capability used to load the meta data in the memory 144 of the controller 130 is limited or restricted, the increase in an amount of loaded meta data may cause an operational burden on the controller 130. For example, because of the limitation of space or region allocated for meta data in the memory 144 of the controller 130, only some, but not all, of the meta data may be loaded. If the loaded meta data does not include specific meta data for a physical location to which the host 102 intends to access, the controller 130 must store the loaded meta data back into the memory device 150 if some of the loaded meta data has been updated, as well as load the specific meta data for the physical location the host 102 intends to access. These operations should be performed for the controller 130 to perform a read operation or a write operation directed by the host 102, and may degrade performance of the memory system 110.

Storage capability of the host memory 106 in the host 102 may be tens or even hundreds of times larger than that of the memory 144 in the controller 130. The memory system 110 may transfer meta data 166 used by the controller 130 to the host memory 106 so that at least some part or portion of the host memory 106 may be accessed by the memory system 110. The part of the host memory 106 accessible by the memory system 110 can be used as a cache memory for address translation required for reading or writing data in the memory system 110. In this case, the host 102 translates a logical address into a physical address based on the meta data 166 stored in the host memory 106 before transmitting the logical address along with a request, a command, or an instruction to the memory system 110. Then, the host 102 can transmit the translated physical address with the request, the command, or the instruction to the memory system 110. The memory system 110, which receives the translated physical address with the request, the command, or the instruction, may skip an internal process of translating the logical address into the physical address and access the memory device 150 based on the physical address transferred. In this case, overhead (e.g., operational burden) of the controller 130 loading meta data from the memory device 150 for the address translation may be reduced or eliminated, and operational efficiency of the memory system 110 can be enhanced.

On the other hand, even if the memory system 110 transmits the meta data 166 to the host 102, the memory system 110 can control mapping information based on the meta data 166 such as meta data generation, erase, update, and the like. The controller 130 in the memory system 110 may perform a background operation such as garbage collection or wear leveling according to an operation state of the memory device 150 and may determine a physical address, i.e., which physical location in the memory device 150 data transferred from the host 102 is to be stored. Because a physical address of data stored in the memory device 150 may be changed and the host 102 has not recognized the changed physical address, the memory system 110 may control the meta data 166 on its own initiative.

While the memory system 110 controls meta data used for the address translation, it can be determined that the memory system 110 needs to modify or update the meta data 166 previously transmitted to the host 102. The memory system 110 can send a signal or meta data to the host 102 so as to request the update of the meta data 166 stored in the host 102. The host 102 may update the stored meta data 166 in the host memory 106 in response to a request delivered from the memory system 110. This allows the meta data 166 stored in the host memory 106 in the host 102 to be kept as the latest version such that, even though the host controller interface 108 uses the meta data 166 stored in the host memory 106, there is no problem in an operation that a logical address is translated into a physical address and the translated physical address is transmitted along with the logical address to the memory system 110.

The meta data 166 stored in the host memory 106 may include mapping information used for translating a logical address into a physical address.

Referring to FIG. 8, meta data associating a logical address with a physical address may include two distinguishable items: a first mapping information item used for translating a logical address into a physical address; and a second mapping information item used for translating a physical address into a logical address. Among them, the meta data 166 stored in the host memory 106 may include the first mapping information. The second mapping information can be primarily used for internal operations of the memory system 110, but might not be used for operations requested by the host 102 to store data in the memory system 110 or read data corresponding to a particular logical address from the memory system 110. In an embodiment, the second mapping information item might not be transmitted by the memory system 110 to the host 102.

The controller 130 in the memory system 110 can control (e.g., create, delete, update, etc.) the first mapping information item or the second mapping information item, and store either the first mapping information item or the second mapping information item to the memory device 150. Because the host memory 106 is a type of volatile memory, the meta data 166 stored in the host memory 106 may disappear when an event such as interruption of power supply to the host 102 and the memory system 110 occurs. Accordingly, the controller 130 in the memory system 110 might not only keep the latest state of the meta data 166 stored in the host memory 106, but also store the latest state of the first mapping information item or the second mapping information item in the memory device 150.

Hereinafter, a method of updating, by a controller 130 included in a memory system 110, dirty information D_INF is described with reference to FIGS. 8, 9A and 9B. The update of the dirty information D_INF may include a change in the state value of the dirty information D_INF.

Figure 9A:
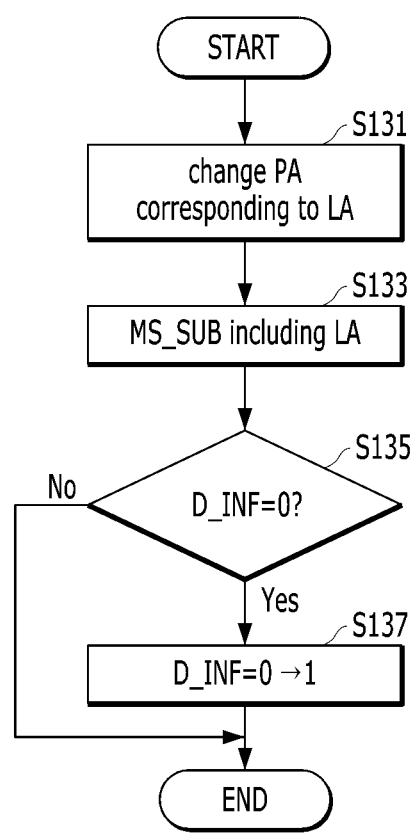

Referring to FIGS. 8 and 9A, if a physical address PA corresponding to a given logical address LA in map data uploaded to a host 102 is changed (S131), the controller 130 searches for a sub-segment L2P_MS_SUB including the given logical address LA (S133). The controller 130 determines a state value of dirty information D_INF of the retrieved sub-segment L2P_MS_SUB (S135).

If, as a result of the determination at step S135, the state value of the dirty information D_INF is "0" (Yes in S135), the controller 130 changes the state value of the dirty information D_INF to "1" (S137). If, as a result of the determination at step S135, the state value of the dirty information D_INF is "1" (No in S135), the controller 130 does not change the state value of the dirty information D_INF.

The dirty information D_INF is state information STATE_INF indicating whether the physical address PA, at which user data according to the logical address LA has been stored, has been changed. The state value "0" of the dirty information D_INF may indicate that after the physical address PA mapped to the logical address LA is uploaded to the host 102, the physical address corresponding to the logical address has not been changed. The state value "1" of the dirty information D_INF may indicate that after the physical address PA mapped to the logical address LA is uploaded to the host 102, the physical address corresponding to the logical address has been changed.

FIG. 9B illustrates a detailed method of updating, by the controller 130, the dirty information D_INF. In the description of FIG. 9B, the dirty information D_INF has a bitmap form, but the present invention is not limited thereto.

Referring to FIGS. 8 and 9B, after map data is uploaded to the host 102, if a physical address PA mapped to a given logical address LA37 is changed (S131), the controller 130 searches for a sub-segment L2P_MS_SUB including the logical address LA37. Furthermore, the controller 130 identifies that the logical address LA37 is included in the fourth L2P sub-segment L2P_MS #1_SUB #3 of the second L2P map segment L2P_MS #1 (S133).

The controller 130 determines dirty information D_INF of the fourth L2P sub-segment L2P_MS #1_SUB #3 of the second L2P map segment L2P_MS #1 (S135). In this case, since a state value of the dirty information D_INF of the fourth L2P sub-segment L2P_MS #1_SUB #3 of the second L2P map segment L2P_MS #1 is "1" (No in S135), the controller 130 may recognize that map data for the logical address of the fourth L2P sub-segment L2P_MS #1_SUB #3 of the second L2P map segment L2P_MS #1 has already been updated and a change in the physical address PA mapped to the given logical address LA37 at step S131 is not the first. Accordingly, the controller 130 does not change the state value of the dirty information D_INF of the fourth L2P sub-segment L2P_MS #1_SUB #3 of the second L2P map segment L2P_MS #1.

Furthermore, after map data is uploaded to the host 102, if a physical address PA mapped to a logical address LA28 is changed (S131), the controller 130 searches a sub-segment L2P_MS_SUB including the logical address LA28. Furthermore, the controller 130 identifies that the logical address LA28 is included in the second L2P sub-segment L2P_MS #1_SUB #1 of the second L2P map segment L2P_MS #1 (S133).

The controller 130 determines dirty information D_INF of the second L2P sub-segment L2P_MS #1_SUB #1 of the second L2P map segment L2P_MS #1 (S135). In this case, since a state value of the dirty information D_INF of the second L2P sub-segment L2P_MS #1_SUB #1 of the second L2P map segment L2P_MS #1 is "0" (Yes in S135), the controller 130 may recognize that map data for the logical address of the second L2P sub-segment L2P_MS #1_SUB #1 of the second L2P map segment L2P_MS #1 has not been updated and a change in the physical address PA mapped to the given logical address LA37 at step S131 is the first change. Accordingly, the controller 130 changes the state value of the dirty information D_INF of the second L2P sub-segment L2P_MS #1_SUB #1 of the second L2P map segment L2P_MS #1 to "1."

If dirty information D_INF is generated for each L2P map segment L2P_MS instead of an L2P sub-segment L2P_MS_SUB, although only a physical address PA mapped to one logical address is changed, the controller 130 needs to change all state values of dirty information D_INF corresponding to 20 logical addresses included in the L2P map segment L2P_MS. That is, the controller 130 needs to change even the state values of the dirty information D_INF of the 19 logical addresses whose update is unnecessary in order to update the state value of the dirty information D_INF of one logical address.

However, in an embodiment, dirty information D_INF is generated and updated for each L2P sub-segment L2P_MS_SUB instead of an L2P map segment L2P_MS. Accordingly, if a physical address PA mapped to one logical address is changed, the controller 130 changes only state values of dirty information D_INF corresponding to 5 logical addresses included in an L2P sub-segment L2P_MS_SUB, instead of state values of dirty information D_INF corresponding to 20 logical addresses included in an L2P map segment L2P_MS. That is, the controller 130 according to an embodiment of this disclosure has only to change state values of dirty information D_INF corresponding to 4 logical addresses whose update is unnecessary, in order to update a state value of dirty information D_INF of one logical address. Accordingly, an embodiment of this disclosure can improve efficiency of map data management compared to a case where state information STATE_INF is generated and updated for each L2P map segment L2P_MS.

Furthermore, although not illustrated in the drawings, the controller 130 may invalidate an old physical address old PA as a physical address PA mapped to a logical address generated at step S131 is changed. To this end, the controller 130 may invalidate the old physical address by changing a state value of invalid address information INV_INF.

As described above, an embodiment of this disclosure can improve map data management, e.g., make such management more convenient, by changing a value of state information of map data, stored in the memory device 150, which state information is represented in a bitmap form, a flag form, a table form or a list form, and writing whether a physical address corresponding to a given logical address has been changed and an invalidated physical address, when the storage location (i.e., physical address) of user data stored in the memory system is changed.

Furthermore, an embodiment of this disclosure can improve efficiency of map data management by generating and updating state information of map data for each of a plurality of sub-segments of each map segment, instead of the map segment unit as a whole.

FIG. 10 illustrates a method of transmitting, by the host 102 illustrated in FIG. 8, a physical address PA_1 to the memory system 110 along with a command CMD and a logical address LA_1 and performing, by the memory system 110, a command operation on the physical address PA_1 received from the host 102.

FIG. 11 illustrates an example of the command format CMD format of a command transmitted from the host 102 of FIGS. 8 and 10 to the memory system 110. In particular, FIG. 11 illustrates an example of the command format CMD format of a read command Read CMD including a logical address LA_1 and a physical address PA_1.

Figure 12:
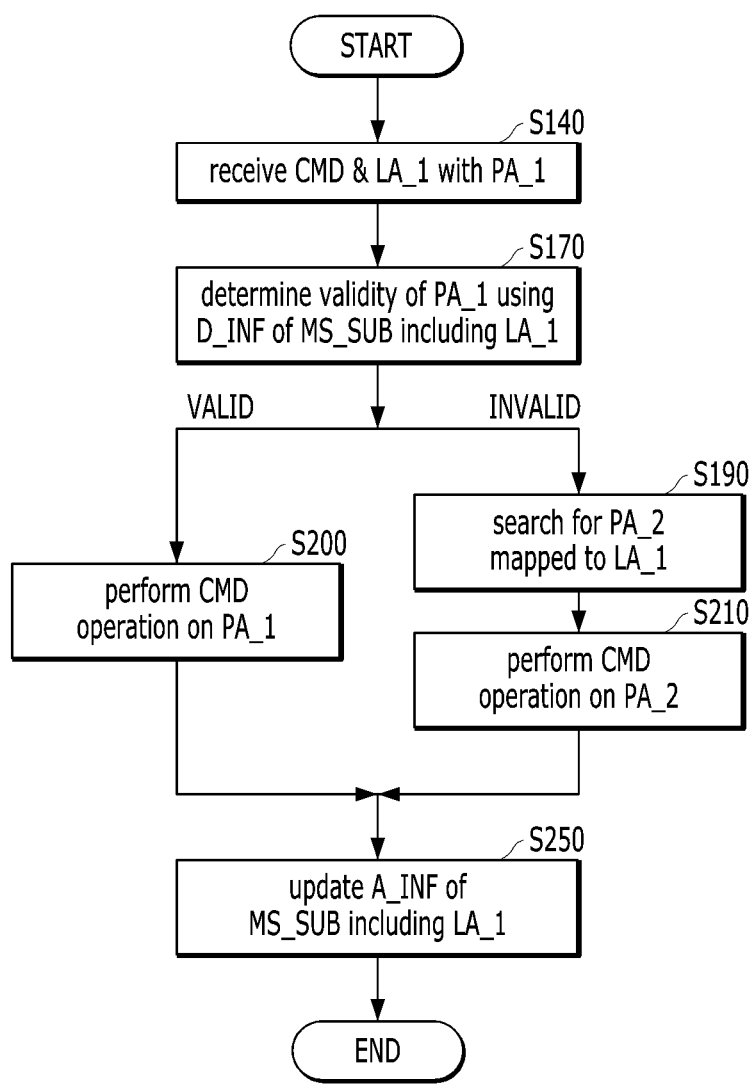

FIG. 12 illustrates a method of performing, by the controller 130, a command operation on a logical address LA_1 and physical address PA_1 received from the host 102.

Hereinafter, a method of performing, by the memory system 110 according to an embodiment of this disclosure, a command operation on a physical address PA_1 received from the host 102 along with a command and a logical address LA_1 is described with reference to FIGS. 8 to 11.

Referring to FIGS. 8 to 11, the host 102 includes a host memory 106 and a host controller interface 108. Host map data MAP_H is stored in the host memory 106. Furthermore, the memory system 110 includes a controller 130 and a memory device 150. Controller map data MAP_C is stored in a memory 144.

Referring to FIGS. 8 to 11, when the host 102 and the memory system 110 are powered on (power-on in FIG. 6), the host 102 and the memory system 110 may operably engage each other. In this case, the controller 130 may load memory map data MAP_M (e.g., L2P MAP) stored in the memory device 150. The controller 130 may store the memory map data MAP_M, loaded from the memory device 150, in the memory 144 as controller map data MAP_C. Furthermore, the controller 130 may transmit the controller map data MAP_C, stored in the memory 144, to the host 102. The host 102 may store the controller map data MAP_C, received from the controller 130, in the host memory 106 as host map data MAP_H.

When a command CMD is generated by a processor 104 within the host 102, the generated command is transmitted to the host controller interface 108. After receiving the command from the processor 104, the host controller interface 108 transmits a logical address LA_1, corresponding to the command, to the host memory 106.

The host controller interface 108 may recognize a physical address PA_1, corresponding to the logical address LA_1, based on map data L2P MAP included in the host map data MAP_H stored in the host memory 106.

The host controller interface 108 transmits the physical address PA_1 to the controller 130 within the memory system 110 along with the command and the logical address LA_1. In this case, the host controller interface 108 may transmit the physical address PA_1, included in the reserved area of a command format, to the memory system 110. That is, as illustrated in FIG. 10, the host controller interface 108 may transmit the logical address LA_1 and the physical address PA_1 included in the command format of a read command, to the memory system 110.

The controller 130 determines the validity of the physical address PA_1 received along with the command. Furthermore, the controller 130 may perform a command operation on the memory device 150 based on the received command CMD and the valid physical address PA_1.

In the above-described process of performing a command operation, a process of receiving, by the controller 130, the logical address LA_1 from the host 102 and searching for the physical address PA_1 corresponding to the logical address LA_1 may be omitted. In particular, in the process of searching for the physical address PA_1 by the controller 130, an operation of accessing the memory device 150 and reading the memory map data MAP_M may be omitted. Accordingly, a process of performing, by the host 102, a command operation on the memory system 110 can become faster.

Furthermore, the controller 130 updates access information A_INF of the logical address LA_1 on which an operation for a command has been performed.

Hereinafter, a detailed method of performing, by the controller 130, a command operation on the physical address PA_1 received from the host 102 along with the command and the logical address LA_1 is described with reference to FIGS. 8 to 12.

Referring to FIGS. 8 to 12, the controller 130 receives a first physical address PA_1 from the host 102 along with a command and a first logical address LA_1 (S140).

The controller 130 determines the validity of the first physical address PA_1 received from the host 102 (S170). In this case, the controller 130 may determine the validity of the first physical address PA_1 using dirty information D_INF of sub-segment L2P_MS_SUB including the first logical address LA_1.

The dirty information D_INF and the invalid address information INV_INF may be generated by the method described with reference to FIGS. 1A and 1B, and may be updated by the method described with reference to FIGS. 9A and 9B.

If, as a result of the determination at step S170, the first physical address PA_1 is valid, the controller 130 performs a command operation on the valid first physical address PA_1 (S200). Furthermore, the controller 130 updates access information A_INF of a sub-segment L2P_MS_SUB including the first logical address LA_1 (S250).

If, as a result of the determination at step S170, the first physical address PA_1 is invalid, the controller 130 searches controller map data MAP_C or memory map data MAP_M for a second physical address PA_2 mapped to the first logical address LA_1 received from the host 102 (S190).

Furthermore, the controller 130 performs a command operation according to the command on the retrieved second physical address PA_2 (S210). Furthermore, the controller 130 updates the access information A_INF of the sub-segment L2P_MS_SUB including the first logical address LA_1 (S250). A method of updating the access information A_INF at step S250 is described in detail below with reference to FIGS. 13A, 13B, 14A and 14B.

A method of performing a command operation according to an embodiment of this disclosure is described, assuming that dirty information D_INF is generated and managed for each sub-segment L2P_MS_SUB, the first logical address LA_1 received from the host 102 is "LA4", and the first physical address PA_1 received along with the first logical address LA_1 is "PA77."

Referring to the dirty information D_INF illustrated in FIG. 9B, the controller 130 may recognize that a state value of the dirty information D_INF of the first L2P sub-segment L2P_MS #0_SUB #0 of the first L2P map segment L2P_MS #0 including the first logical address LA4 is "0." Accordingly, the controller 130 determines the first physical address PA77, received from the host 102 along with the first logical address LA4, to be a valid physical address because a physical address mapped to the first logical address LA4 has not been changed. Furthermore, the controller 130 performs a command operation on the first physical address PA77 received from the host 102 without performing a separate L2P search process at step S190 (S200).

If dirty information D_INF is generated and updated for each map segment L2P_MS instead of each sub-segment L2P_MS_SUB, a state value of the dirty information D_INF of the first L2P map segment L2P_MS #0 becomes "1" because logical addresses "LA10 to LA14" in the first L2P map segment L2P_MS #0 including the first logical address LA4 have been updated. That is, a state value of the dirty information D_INF of the not-updated logical address "LA4" also becomes "1" due to the updated logical addresses "LA10 to LA14." At this time, the controller 130 recognizes that a physical address mapped to the first logical address LA4 has been changed and determines the first physical address PA77 to be an invalid physical address, at step S170. Furthermore, the controller 130 performs an unnecessary L2P search and conversion process at step S190, which results in overhead of the memory system 110.

As described above, an embodiment of this disclosure can reduce overhead of the memory system 110 occurring due to an unnecessary L2P search and conversion process by generating and updating dirty information D_INF for each sub-segment L2P_MS_SUB and generating and updating invalid address information INV_INF. Accordingly, an embodiment of this disclosure can increase and thus improve the execution speed of a command operation of the memory system 110 and efficiency of a command operation.

Hereinafter, a method of updating access information A_INF according to a first embodiment of this disclosure is described with reference to FIGS. 8, 13A and 13B. In particular, FIGS. 13A and 13B illustrate a method of updating, by the controller 130, access information A_INF in a bitmap form after the controller 130 performs the command operation according to the command at steps S200 and S210 in FIG. 12.

Access information A_INF in a bitmap form may indicate whether an access request for map data, corresponding to a logical address LA_1, from the host 102 has been made. A state value "0" of the access information A_INF may indicate that no access request for the logical address LA_1 from the host 102 has been made after map data is uploaded to the host 102. A state value "1" of the access information A_INF may indicate that an access request for the logical address LA_1 from the host 102 has been made after map data is uploaded to the host 102.

Figure 13A:
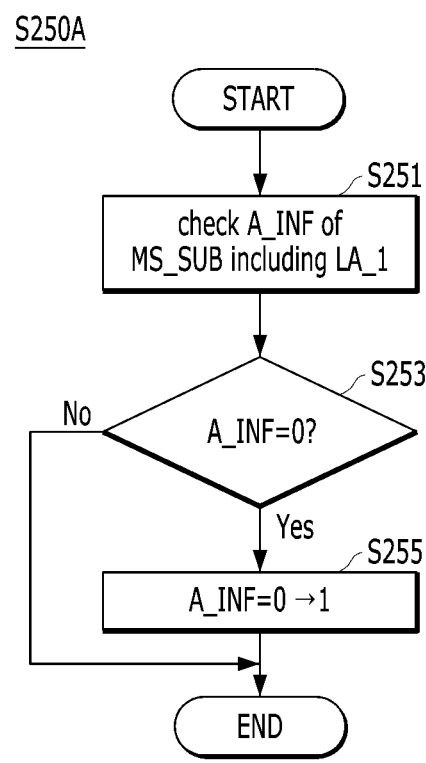

Referring to FIG. 13A, the controller 130 identifies a sub-segment L2P_MS_SUB including the logical address LA_1 (S251). The controller 130 determines a state value of the access information A_INF of the sub-segment L2P_MS_SUB including the logical address LA_1 (S253). If, as a result of the determination at step S253, the state value of the access information A_INF of the sub-segment L2P_MS_SUB is "0" (Yes in S235), the controller 130 changes the state value of the access information A_INF to "1" (S137). If, as a result of the determination at step S253, the state value of the access information A_INF of the sub-segment L2P_MS_SUB is "1", not "0" (No in S135), the controller 130 does not change the state value of the access information A_INF.

If the first logical address LA_1 received from the host 102 at step S140 in FIG. 12 or the first logical address LA_1 on which the command operation has been performed at steps S200 and S210 in FIG. 12 is "LA37", the controller 130 may identify that the logical address LA37 is included in the fourth L2P sub-segment L2P_MS #1_SUB #3 of the second L2P map segment L2P_MS #1 (S251). Furthermore, the controller 130 determines a state value of the access information A_INF of the fourth L2P sub-segment L2P_MS #1_SUB #3 of the second L2P map segment L2P_MS #1 (S253). Since a state value of the access information A_INF of the fourth L2P sub-segment L2P_MS #1_SUB #3 of the second L2P map segment L2P_MS #1 is "1", not "0" (No in S253), the controller 130 does not change the state value of the access information A_INF of the fourth L2P sub-segment L2P_MS #1_SUB #3 of the second L2P map segment L2P_MS #1.

If the first logical address LA_1 received from the host 102 at step S140 in FIG. 12 or the first logical address LA_1 on which the command operation has been performed at steps S200 and S210 in FIG. 12 is "LA28", the controller 130 may identify that the logical address LA28 is included in the second L2P sub-segment L2P_MS #1_SUB #1 of the second L2P map segment L2P_MS #1 (S251). Furthermore, the controller 130 determines a state value of the access information A_INF of the second L2P sub-segment L2P_MS #1_SUB #1 of the second L2P map segment L2P_MS #1 (S253). Since a state value of the access information A_INF of the second L2P sub-segment L2P_MS #1_SUB #1 of the second L2P map segment L2P_MS #1 is "0" (Yes in S253), the controller 130 may change the state value of the access information A_INF of the second L2P sub-segment L2P_MS #1_SUB #1 of the second L2P map segment L2P_MS #1 from "0" to "1" (S255).

Hereinafter, a method of updating access information A_INF according to a second embodiment of this disclosure is described with reference to FIGS. 8, 14A and 14B. In particular, FIG. 14B illustrates a method of updating, by the controller 130, access information A_INF in a counter form after the controller 130 performs the command operation according to the command, at steps S200 and S210 in FIG. 12.

The access information A_INF in a counter form may indicate the number of access requests for map data, corresponding to the logical address LA_1, from the host 102. A state value "0" of the access information A_INF may indicate that no access request for the logical address LA_1 from the host 102 has been made after map data is uploaded to the host 102. Access information A_INF having a state value of "1" or more may indicate the number of access request(s) for the logical address LA_1 from the host 102 that have been made after map data is uploaded to the host 102.

Figure 14A:
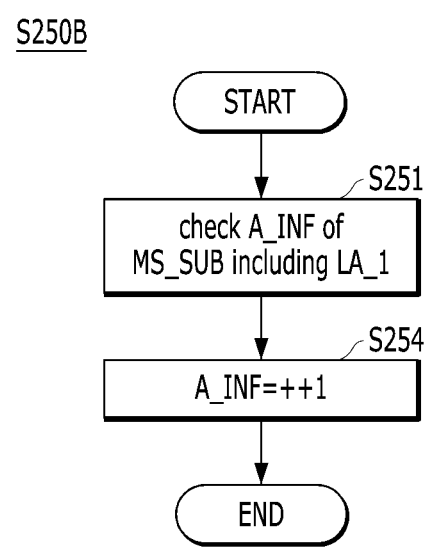

Referring to FIGS. 14A and 14B, the controller 130 identifies a sub-segment L2P_MS_SUB including the logical address LA_1 (S251). The controller 130 increases a state value of the access information A_INF of the sub-segment L2P_MS_SUB including the logical address LA_1 by "1" (S254).

If the first logical address LA_1 received from the host 102 at step S140 in FIG. 12 and the first logical address LA_1 on which the command operation has been performed at steps S200 and S210 in FIG. 12 are "LA23", the controller 130 may identify that the logical address LA37 is included in the first L2P sub-segment L2P_MS #1_SUB #0 of the second L2P map segment L2P_MS #1 (S251). Furthermore, the controller 130 checks a state value of the access information A_INF of the first L2P sub-segment L2P_MS #1_SUB #0 of the second L2P map segment L2P_MS #1 (S253).

Since the state value of the access information A_INF of the first L2P sub-segment L2P_MS #1_SUB #0 is "5", the controller 130 changes the state value from "5" to "6" by increasing the state value by "1" (S254).

If the first logical address LA_1 received from the host 102 at step S140 in FIG. 12 and the first logical address LA_1 on which the command operation has been performed at steps S200 and S210 in FIG. 12 are "LA55", the controller 130 may identify that the logical address LA28 is included in the fourth L2P sub-segment L2P_MS #2_SUB #3 of the third L2P map segment L2P_MS #2 (S251). Furthermore, the controller 130 checks a state value of the access information A_INF of the fourth L2P sub-segment L2P_MS #2_SUB #3 of the third L2P map segment L2P_MS #2 (S253).

Because the state value of the access information A_INF of the fourth L2P sub-segment L2P_MS #2_SUB #3 of the third L2P map segment L2P_MS #2 is "2", the controller 130 changes the state value from "2" to "3" by increasing the state value by "1" (S254).

Figure 15:
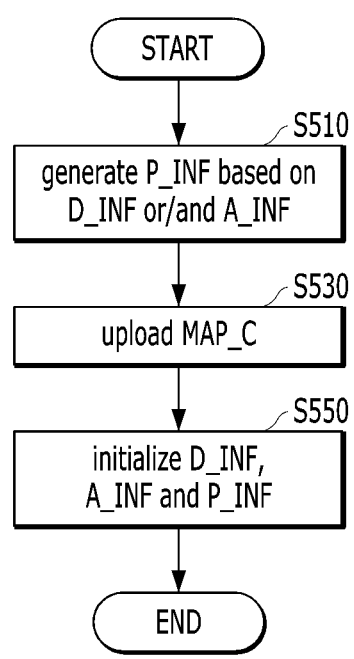

Hereinafter, a method of uploading, by the controller 130, controller map data MAP_C to the host 102 is described with reference to FIGS. 8 and 15.

The controller 130 generates priority information P_INF based on dirty information D_INF and/or access information A_INF (S510).

The controller 130 uploads controller map data MAP_C for the map segment (MS) unit based on the generated uploading priority information P_INF (S530).

After the uploading of the controller map data MAP_C is completed at step S530, the controller 130 initializes the dirty information D_INF, the access information A_INF and the priority information P_INF (S550).

The generation of the priority information P_INF at step S510 may be performed before the controller map data MAP_C is uploaded to the host 102.

Furthermore, at step S530, the controller 130 may upload the controller map data MAP_C to the host 102 if a degree that the controller map data MAP_C becomes dirty is higher than a preset reference or if the memory system 110 is in an idle state. Furthermore, the controller 130 may upload the controller map data MAP_C to the host 102 when receiving an uploading request from the host 102.

FIGS. 16 and 17 illustrate a method of generating priority information P_INF using dirty information D_INF in a bitmap form and access information A_INF in a bitmap form.

Hereinafter, a method of generating priority information P_INF according to a first embodiment of this disclosure is described with reference to FIGS. 8 and 16. In particular, FIG. 16 illustrates a method of generating second priority information P_INF_D using dirty information D_INF in a bitmap form.

Referring to FIG. 16, the controller 130 calculates a sum (SUM) by adding the number of pieces of dirty information D_INF having a state value "1" for each L2P sub-segment L2P_MS_SUB. The sum (SUM) may indicate the number of L2P sub-segments L2P_MS_SUB that belong to L2P sub-segments L2P_MS_SUB included in an L2P map segment L2P_MS and whose physical addresses have been changed.

The sum (SUM) of a first L2P map segment L2P_MS #0 may be "1." The sum (SUM) of a second L2P map segment L2P_MS #1 may be "3." The sum (SUM) of a third L2P map segment L2P_MS #2 may be "4." The sum (SUM) of a fourth L2P map segment L2P_MS #3 may be "2."

Based on the sum (SUM) calculated for each L2P map segment L2P_MS, the controller 130 may set second priority information P_INF_D of the third L2P map segment L2P_MS #2 as the first priority, may set second priority information P_INF_D of the second L2P map segment L2P_MS #1 as the second priority, may set second priority information P_INF_D of the fourth L2P map segment L2P_MS #3 as the third priority, and may set second priority information P_INF_D of the first L2P map segment L2P_MS #0 as the fourth priority.

As described above, the method of generating second priority information P_INF_D according to an embodiment of this disclosure, illustrated in FIG. 16, can raise the uploading priority of an L2P map segment L2P_MS including many L2P sub-segments L2P_MS_SUB whose physical addresses have been changed.

Hereinafter, a method of generating priority information P_INF according to a second embodiment of this disclosure is described with reference to FIGS. 8 and 17. In particular, FIG. 17 illustrates a method of generating third priority information P_INF_A using access information A_INF in a bitmap form.

Referring to FIG. 17, the controller 130 calculates a sum (SUM) by adding the number of pieces of access information A_INF having a state value "1" for each L2P sub-segment L2P_MS_SUB. The sum (SUM) may indicate the number of L2P sub-segments L2P_MS_SUB that belong to L2P sub-segments L2P_MS_SUB included in an L2P map segment L2P_MS and that has been requested by the host.

The sum (SUM) of a first L2P map segment L2P_MS #0 may be "1." The sum (SUM) of a second L2P map segment L2P_MS #1 may be "3." The sum (SUM) of a third L2P map segment L2P_MS #2 may be "4." The sum (SUM) of a fourth L2P map segment L2P_MS #3 may be "2."

Based on the sum (SUM) calculated for each L2P map segment L2P_MS, the controller 130 may set third priority information P_INF_A of the third L2P map segment L2P_MS #2 as the first priority, may set third priority information P_INF_A of the second L2P map segment L2P_MS #1 as the second priority, may set third priority information P_INF_A of the fourth L2P map segment L2P_MS #3 as the third priority, and may set third priority information P_INF_A of the first L2P map segment L2P_MS #0 as the fourth priority.

As described above, the method of generating the third priority information P_INF_A according to an embodiment of this disclosure, illustrated in FIG. 17, can raise the uploading priority of an L2P map segment L2P_MS including many L2P sub-segments L2P_MS_SUB requested by the host.

Hereinafter, a method of generating priority information P_INF according to a third embodiment of this disclosure is described with reference to FIGS. 8 and 18. In particular, FIG. 18 illustrates a method of generating third priority information P_INF_A using access information A_INF in a counter form.

Referring to FIG. 18, a state value of the access information A_INF of a fourth L2P sub-segment L2P_MS #0_SUB3 included in a first L2P map segment L2P_MS #0 may be "20." A state value of the access information A_INF of a first L2P sub-segment L2P_MS #1_SUB0 included in a second L2P map segment L2P_MS #1 may be "7." A state value of the access information A_INF of a first L2P sub-segment L2P_MS #2_SUB0 included in a third L2P map segment L2P_MS #2 may be "6." State values of the access information A_INF of a first L2P sub-segment L2P_MS #3_SUB0 and a fourth L2P sub-segment L2P_MS #3_SUB3 included in a fourth L2P map segment L2P_MS #3 may be "1."

Accordingly, the controller 130 may generate ranking information RANKING having a high priority as a state value of the access information A_INF (i.e., the number of access requests) of each of L2P sub-segments increases.

Based on a state value of the access information A_INF of each sub-segment L2P_MS_SUB, the controller 130 may set ranking information RANKING of the first L2P map segment L2P_MS #0 to "1", may set ranking information RANKING of the second L2P map segment L2P_MS #1 to "2", may set ranking information RANKING of the third L2P map segment L2P_MS #2 to "3", and may set ranking information RANKING of the fourth L2P map segment L2P_MS #3 to "9".

The state value of the access information A_INF may indicate the number of requests from the host. The ranking information RANKING may indicate relative priorities of the map segments.

Based on the ranking information RANKING of each sub-segment L2P_MS_SUB, the controller 130 may set the third priority information P_INF_A of the first L2P map segment L2P_MS #0 as the first priority, may set the third priority information P_INF_A of the second L2P map segment L2P_MS #1 as the second priority, may set the third priority information P_INF_A of the third L2P map segment L2P_MS #2 as the third priority, and may set the third priority information P_INF_A of the fourth L2P map segment L2P_MS #3 as the fourth priority.

L2P sub-segments L2P_MS_SUB having ranking information RANKING of "4 to 8" are included in the second L2P map segment L2P_MS #1 and the third L2P map segment L2P_MS #2, which have been determined to be the first priority and the third priority, respectively. Accordingly, the third priority information P_INF_A of the fourth L2P map segment L2P_MS #3 having ranking information RANKING of "9" may be set to the fourth priority.

As described above, the method of generating priority information P_INF according to the third embodiment of this disclosure, illustrated in FIG. 18, can raise the uploading priority of a map segment including sub-segment having many access requests from the host.

Figure 19A:
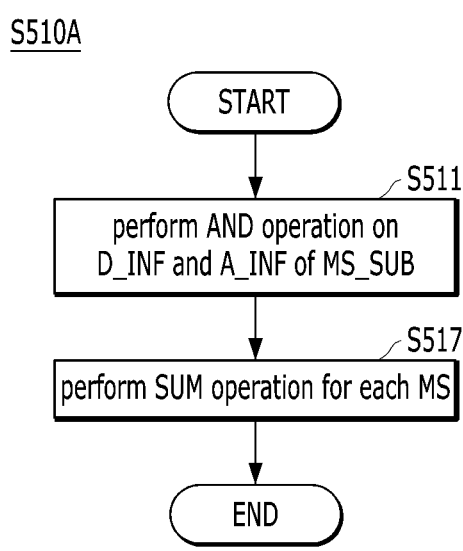

Hereinafter, a method of generating priority information P_INF according to a fourth embodiment of this disclosure is described with reference to FIG. 8, FIG. 19A and FIG. 19B. In particular, FIG. 19A and FIG. 19B illustrate a method of generating first priority information P_INF_N using dirty information D_INF in a bitmap form and access information A_INF in a bitmap form.

The controller 130 may generate the first priority information P_INF_N, based on the dirty information D_INF and the access information A_INF, in order to upload controller map data MAP_C to the host 102.

The dirty information D_INF may be updated for each L2P sub-segment L2P_MS_SUB as described with reference to FIGS. 9A and 9B. The access information A_INF may be updated for each L2P sub-segment L2P_MS_SUB as described with reference to FIGS. 13A and 13B.

The first priority information P_INF_N may be generated for each map segment L2P_MS. That is, the controller 130 may generate the first priority information P_INF_N for each map segment L2P_MS based on the dirty information D_INF and access information A_INF updated for each L2P sub-segment L2P_MS_SUB.

Referring to FIG. 19A, the controller 130 calculates an operation result (AND) by performing an AND operation on state values of dirty information D_INF and access information A_INF updated for each L2P sub-segment L2P_MS_SUB (S511). The controller 130 calculates a sum (SUM) by adding the operation result (AND), calculated for each L2P sub-segment L2P_MS_SUB, for each map segment MS (S517). The controller 130 may generate the first priority information P_INF_N of a map segment MS based on the sum (SUM).

Referring to FIG. 19B, the controller 130 calculates an operation result (AND) by performing an AND operation on dirty information D_INF and access information A_INF managed for each L2P sub-segment L2P_MS_SUB.

The controller 130 calculates a sum (SUM) by adding the operation result (AND), calculated for each L2P sub-segment L2P_MS_SUB, for each map segment MS. The sum (SUM) of a first L2P map segment L2P_MS #0 may be "0", the sum (SUM) of a second L2P map segment L2P_MS #1 may be "1", the sum (SUM) of a third L2P map segment L2P_MS #2 may be "4", and the sum (SUM) of a fourth L2P map segment L2P_MS #3 may be "2."

Accordingly, based on the sum (SUM) of each map segment MS, the controller 130 may set the first priority information P_INF_N of the third L2P map segment L2P_MS #2 as the first priority, may set the first priority information P_INF_N of the fourth L2P map segment L2P_MS #3 as the second priority, may set the first priority information P_INF_N of the second L2P map segment L2P_MS #1 as the third priority, and may set the first priority information P_INF_N of the first L2P map segment L2P_MS #0 as the fourth priority.

Accordingly, the controller 130 may preferentially upload, to the host, an L2P map segment L2P_MS including many L2P sub-segments L2P_MS_SUB whose physical address corresponding to a logical address has been changed and for which an access request from the host has been made, based on the first priority information P_INF_N described with reference to FIG. 19A and FIG. 19B.

Hereinafter, a method of generating priority information P_INF according to a fifth embodiment of this disclosure is described with reference to FIGS. 8, 20A and 20B. In particular, FIGS. 20A and 20B illustrate a method of generating priority information P_INF using dirty information D_INF in a bitmap form and access information A_INF in a bitmap form, but generating second priority information P_INF_D in which a weight has been given to the dirty information D_INF.

Figure 20A:
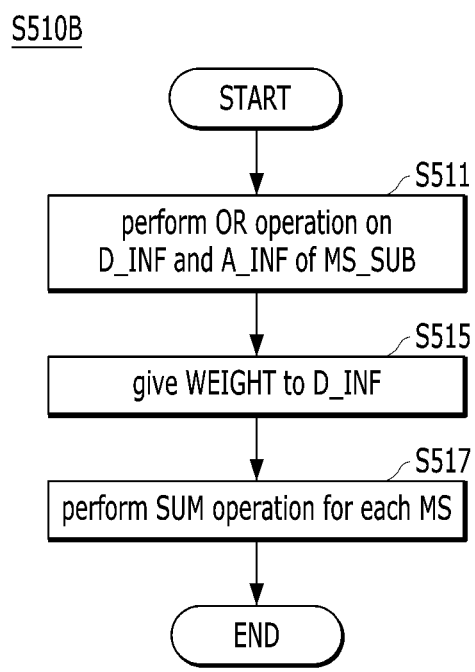

Referring to FIG. 20A, the controller 130 calculates an operation result (OR) by performing an OR operation on state values of dirty information D_INF and access information A_INF updated for each L2P sub-segment L2P_MS_SUB (S511). The controller 130 gives a weight for the dirty information D_INF to the calculated operation result (OR) (S515). The controller 130 calculates a sum (SUM) by adding values D_INF_W, which are calculated for each L2P sub-segment L2P_MS_SUB and to which weights for dirty information D_INF have been given, for each map segment MS (S517). The controller 130 may generate the second priority information P_INF_D of a map segment MS based on the sum (SUM).

Referring to FIG. 20B, the sum (SUM) of a first L2P map segment L2P_MS #0 may be "3", the sum (SUM) of a second L2P map segment L2P_MS #1 may be "6", the sum (SUM) of a third L2P map segment L2P_MS #2 may be "8", and the sum (SUM) of a fourth L2P map segment L2P_MS #3 may be "8."

Accordingly, based on the sum (SUM) of each map segment MS, the controller 130 may set the second priority information P_INF_D of the third L2P map segment L2P_MS #2 as the first priority, may set the second priority information P_INF_D of the fourth L2P map segment L2P_MS #3 as the second priority, may set the second priority information P_INF_D of the second L2P map segment L2P_MS #1 as the third priority, and may set the second priority information P_INF_D of the first L2P map segment L2P_MS #0 as the fourth priority.

In this case, the sums (SUM) of the third L2P map segment L2P_MS #2 and the fourth L2P map segment L2P_MS #3 are the same, that is, "8." However, in order to give a weight to the dirty information D_INF, the controller 130 sets the second priority information P_INF_D of the third L2P map segment L2P_MS #2 as the first priority, and sets the second priority information P_INF_D of the fourth L2P map segment L2P_MS #3 as the second priority.

Accordingly, the controller 130 may preferentially upload, to the host, an L2P map segment L2P_MS including many L2P sub-segments L2P_MS_SUB whose physical addresses have been changed, among L2P sub-segments L2P_MS_SUB whose physical address corresponding to a logical address has been changed or for which an access request from the host has been made, based on the second priority information P_INF_D described with reference to FIGS. 20A and 20B.

Hereinafter, a method of generating priority information P_INF according to a sixth embodiment of this disclosure is described with reference to FIGS. 8, 21A and 21B. In particular, FIGS. 21A and 21B illustrate a method of generating priority information P_INF using dirty information D_INF and access information A_INF, but generating third priority information P_INF_A in which a weight has been given to the access information A_INF.

Figure 21A:
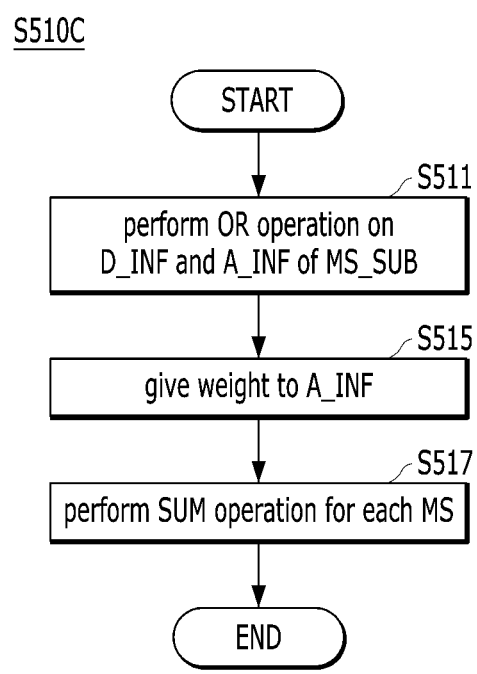

Referring to FIG. 21A, the controller 130 calculates an operation result (OR) by performing an OR operation on state values of dirty information D_INF and access information A_INF updated for each L2P sub-segment L2P_MS_SUB (S511). The controller 130 gives a weight for access information A_INF to the calculated operation result (OR) (S516). The controller 130 calculates a sum (SUM) by adding values, which are calculated for each L2P sub-segment L2P_MS_SUB and to which weights for access information A_INF have been given, for each map segment MS (S517). The controller 130 may generate the third priority information P_INF_A of a map segment MS based on the sum (SUM).

Referring to FIG. 21B, the sum (SUM) of a first L2P map segment L2P_MS #0 may be "3", the sum (SUM) of a second L2P map segment L2P_MS #1 may be "7", the sum (SUM) of the third L2P map segment L2P_MS #2 may be "8", and the sum (SUM) of the fourth L2P map segment L2P_MS #3 may be "6."

Accordingly, based on the sum (SUM) of each map segment MS, the controller 130 may set the third priority information P_INF_A of the third L2P map segment L2P_MS #2 as the first priority, may set the third priority information P_INF_A of the second L2P map segment L2P_MS #1 as the second priority, may set the third priority information P_INF_A of the fourth L2P map segment L2P_MS #3 as the third priority, and may set the third priority information P_INF_A of the first L2P map segment L2P_MS #0 as the fourth priority.

Accordingly, the controller 130 may preferentially upload, to the host, an L2P map segment L2P_MS including many L2P sub-segments L2P_MS_SUB for which access requests from the host have been made, among L2P sub-segments L2P_MS_SUB whose physical address corresponding to a logical address has been changed or for which an access request from the host has been made, based on the third priority information P_INF_A described with reference to FIGS. 21A and 21B.

Hereinafter, a method of generating priority information P_INF according to a seventh embodiment of this disclosure is described with reference to FIGS. 8 and 22. In particular, FIG. 21 illustrates a method of generating priority information P_INF using dirty information D_INF in a bitmap form and access information A_INF in a counter form, but generating third priority information P_INF_A in which a weight has been given to the access information A_INF.

Referring to FIG. 22, the sum (SUM_0) of a first L2P map segment L2P_MS #0 may be "3", the sum (SUM_1) of a second L2P map segment L2P_MS #1 may be "5", the sum (SUM_2) of a third L2P map segment L2P_MS #2 may be "20", and the sum (SUM_3) of a fourth L2P map segment L2P_MS #3 may be "3."

Accordingly, based on the sum (SUM) of each map segment MS, the controller 130 may set the third priority information P_INF_A of the third L2P map segment L2P_MS #2 as the first priority, may set the third priority information P_INF_A of the fourth L2P map segment L2P_MS #3 as the second priority, may set the third priority information P_INF_A of the second L2P map segment L2P_MS #1 as the third priority, and may set the third priority information P_INF_A of the first L2P map segment L2P_MS #0 as the fourth priority.

Accordingly, the controller 130 may preferentially upload, to the host, an L2P map segment L2P_MS including many L2P sub-segments L2P_MS_SUB for which many access requests from the host have been made, among L2P sub-segments L2P_MS_SUB whose physical address corresponding to a logical address has been changed and for which an access request from the host has been made, based on the third priority information P_INF_A described with reference to FIG. 22.

Hereinafter, a method of generating priority information P_INF according to an eighth embodiment of this disclosure is described with reference to FIGS. 8 and 23. In particular, FIG. 23 illustrates a method of generating priority information P_INF using dirty information D_INF in a bitmap form and access information A_INF in a counter form, but generating third priority information P_INF_A in which a weight has been given to the access information A_INF.

The controller 130 calculates an operation result (AND) by performing an AND operation on state values of dirty information D_INF and access information A_INF updated for each L2P sub-segment L2P_MS_SUB.

Thereafter, the controller 130 calculates a representative value of the calculated operation results (AND), and identifies an L2P map segment area L2P_MS whose physical address corresponding to a logical address has been changed and for which an access request from the host has been made. The controller 130 gives a weight for access information A_INF to the calculated representative value (A_INF_W).

The controller 130 calculates a sum (SUM) by adding values A_INF_W, which are calculated for each L2P sub-segment L2P_MS_SUB and to which weights for access information A_INF have been given, for each map segment (MS). The controller 130 may generate the third priority information P_INF_A of a map segment MS based on the sum (SUM).

Referring to FIG. 23, the sum (SUM_0) of a first L2P map segment L2P_MS #0 may be "0", the sum (SUM_1) of a second L2P map segment L2P_MS #1 may be "3", the sum (SUM_2) of a third L2P map segment L2P_MS #2 may be "4", and the sum (SUM_3) of a fourth L2P map segment L2P_MS #3 may be "2."

Accordingly, based on the sum (SUM) of each map segment MS, the controller 130 may set the third priority information P_INF_A of the third L2P map segment L2P_MS #2 as the first priority, may set the third priority information P_INF_A of the second L2P map segment L2P_MS #1 as the second priority, may set the third priority information P_INF_A of the fourth L2P map segment L2P_MS #3 as the third priority, and may set the third priority information P_INF_A of the first L2P map segment L2P_MS #0 as the fourth priority.

Accordingly, the controller 130 may preferentially upload, to the host, an L2P map segment L2P_MS including many L2P sub-segments L2P_MS_SUB for which many access requests from the host have been made, among L2P map segments L2P_MS whose physical address corresponding to a logical address has been changed and for which an access request from the host has been made, based on the third priority information P_INF_A described with reference to FIG. 23.

As described above, operation efficiency of the memory system 110 can be improved based on the different embodiments described with reference to FIGS. 8 to 18 and 19A to 23. The memory system 110 can overcome the limitations of the storage space of the memory 144 used by the controller 130 within the memory system 110 by using some areas of the host memory 106 included in the host 102 as a cache or buffer and storing meta data or user data in the some areas.

Effects of the memory system, the data processing system, and the methods of driving the memory system and data processing system according to embodiments of this disclosure are as follows.

The data processing apparatus including the memory system and the computing apparatus or the host according to an embodiment of this disclosure can reduce overhead in transmitting data between the memory system within the data processing apparatus and the computing apparatus or the host by efficiently controlling an operation of transmitting, by the memory system, map data.

The memory system, data processing system, and methods of driving them according to an embodiment of this disclosure can improve efficiency of map data management by generating and updating state information of map data for each of a plurality of sub-segments of a map segment, instead of the map segment as a whole, of the map data.

The memory system, data processing system, and methods of driving them according to an embodiment of this disclosure can reduce overhead of the memory system by eliminating unnecessary L2P conversion because the memory device performs a command operation in accordance with a physical address received from an external device along with a command, and thus the execution speed of the command operation of the memory system and efficiency of the command operation can be improved.

The memory system, data processing system, and methods of driving them according to an embodiment of this disclosure can improve map data management by changing a value of state information of map data stored in the memory system, which state information is conveniently represented in a bitmap form, a flag form, a table form or a list form, when a physical address of data stored in the memory system is changed, and writing whether the physical address of data corresponding to a given logical address has been changed and an invalid physical address.

The memory system, data processing system, and methods of driving them according to an embodiment of this disclosure can improve the speed of an operation of determining the validity of a physical address because the memory system determines the validity of a physical address, received from an external device along with a command, based on state information of map data without separate map data retrieval, and thus the speed of a command operation can be improved.

Effects and advantages which may be obtained from the present invention are not limited to those described above, as those skilled in the art to which this disclosure pertains will appreciate from the above description.

Although various embodiments have been illustrated and described, it will be apparent to those skilled in the art that various changes and modifications may be made without departing from the spirit and scope of the invention as defined in the following claims. The present invention encompasses all such changes and modifications that fall within the scope of the claims.

What is claimed is:

1. A memory system comprising:
a memory device suitable for storing data; and
a controller suitable for generating and managing map data, and dirty and access information of the map data by units of sub-segments, the map data comprising a logical address of a host and a physical address of the memory device corresponding to the logical address,
wherein the controller uploads at least some of the map data to the host by units of map segments, each including the sub-segments, updates the map data to generate a latest version of the uploaded map data, and updates the dirty and access information of the uploaded map data,
wherein the controller re-uploads at least some of the latest version of the uploaded map data to the host based on uploading priorities that is set based on at least one of the updated dirty information and the updated access information of the sub-segments of the map segment,
wherein the dirty information indicates that a physical address corresponding to a logical address in the sub-segments of the uploaded map data has been changed, and
wherein the access information indicates the number of access requests for the logical address in the uploaded map data has been made from the host.

2. The memory system of claim 1, wherein the controller stores the latest version of the uploaded map data in the memory device by units of map segments.

3. The memory system of claim 1, wherein:
the dirty information initially has a bitmap value of '0', and
the controller updates the dirty information having the bitmap value of '0' of a sub-segment to '1' when the physical address corresponding to the logical address in the sub-segment is changed.

4. The memory system of claim 3, wherein:
the access information initially has a bitmap value of '0', and
the controller updates the access information having the bitmap value of '0' of a sub-segment to '1' when an access request for the logical address in the sub-segment is made by the host.

5. The memory system of claim 3, wherein:
the access information initially has a count value of '0', and
the controller increments the access information having the count value of '0' of a sub-segment by 1 each time an access request for the logical address in the sub-segment is made by the host.

6. The memory system of claim 3, wherein the controller sets a higher uploading priority for a map segment including sub-segments having the bitmap value of '1' of the dirty information.

7. The memory system of claim 4, wherein the controller sets a higher uploading priority for a map segment including sub-segments having the bitmap value of '1' of the access information.

8. The memory system of claim 5, wherein the controller sets an uploading priority for a map segment based on the access information of sub-segment included in the map segment.

9. The memory system of claim 4, wherein the controller sets a higher uploading priority for a map segment including sub-segments in which both the dirty information and the access information are updated.

10. The memory system of claim 4, wherein the controller sets a higher uploading priority for a map segment including sub-segments having the bitmap value of '1' of the dirty information and the bitmap value of '1' of the access information.

11. The memory system of claim 5, wherein the controller sets an uploading priority for a map segment having the bitmap value of '1' of the dirty information, based on the access information of sub-segment included in the map segment.

12. The memory system of claim 1, wherein when a command, a first logical address corresponding to the command, and a first physical address corresponding to the first logical address are received from the host, the controller identifies a sub-segment including the first logical address from the map data and further determines that the first physical address is valid using dirty information of the sub-segment including the first logical address.

13. The memory system of claim 12,
wherein the controller determines the first physical address to be valid when the first dirty information is represented by a first value, and
wherein the controller determines the first physical address to be invalid when the first dirty information is represented by a second value.

14. The memory system of claim 13,
wherein the controller performs a command operation according to the command on the valid first physical address when the controller determines the first physical address is valid, and
wherein the controller updates first access information of the first sub-segment.

15. The memory system of claim 14, wherein the first access information is represented in a bitmap form or a counter form.

16. A memory system comprising:
a memory device suitable for storing data; and
a controller suitable for generating map data comprising a logical address of host and a physical address of the memory device corresponding to the logical address,
wherein the controller uploads at least some of the map data to the host and updates the map data to generate a latest version of the uploaded map data,
wherein the controller generates and updates state information on the map data uploaded to the host by units of sub-segments of the map segment,
wherein the controller re-uploads at least some of the latest version of the uploaded map data to the host based on the state information, and
wherein the state information represents that the physical address corresponding to the logical address in the sub-segment has been changed and that the host has accessed the logical address in the sub-segment,
wherein the state information comprises dirty information indicating that the physical address corresponding to the logical address in the sub-segment has been changed and access information indicating that the host has accessed the logical address in the sub-segment, and
wherein the controller re-uploads at least some of the latest version of the uploaded map data to the host based on uploading priorities that is set based on at least one of the updated dirty information and the updated access information of the sub-segments of the map segment.

17. The memory system of claim 16, wherein the controller transmits the map data to the host based on the dirty information of the sub-segment or the access information of the sub-segment.

18. The memory system of claim 16, wherein when a command, a first logical address corresponding to the command, and a first physical address corresponding to the first logical address are received from the host, the controller determines that the first physical address is valid using dirty information of a sub-segment comprising the first logical address.

19. The memory system of claim 18,
wherein the controller performs a command operation according to the command on the valid first physical address when the controller determines the first physical address is valid, and
wherein the controller updates first access information of the first sub-segment after performing the command operation.

20. An operating method of a controller, the operating method comprising:
generating system segments, each including sub-segments, each having pieces of information, each piece representing a mapping relationship between a logical address and a physical address;
providing the system segments to a host to store as host segments;
accessing, within a memory device, a region related to the physical address, which is included in the piece provided from the host;
updating the system segments to generate a latest version of the host segments; and
re-uploading at least some of the latest version of the host segments based on uploading priorities that is set based on history information representing at least one of that the physical address has changed and the number of times that the region has been accessed by units of sub-segments,
wherein the sub-segment within the system segment includes the history information of the pieces corresponding thereto.

* * * * *